United States Patent
Johnson et al.

(10) Patent No.: US 7,358,009 B2
(45) Date of Patent: Apr. 15, 2008

(54) LAYERED ELECTRODES FOR LITHIUM CELLS AND BATTERIES

(75) Inventors: Christopher S. Johnson, Naperville, IL (US); Michael M. Thackeray, Naperville, IL (US); John T. Vaughey, Elmhurst, IL (US); Arthur J. Kahaian, Chicago, IL (US); Jeom-Soo Kim, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 466 days.

(21) Appl. No.: 10/365,286

(22) Filed: Feb. 12, 2003

(65) Prior Publication Data

US 2003/0180616 A1    Sep. 25, 2003

Related U.S. Application Data

(60) Provisional application No. 60/357,393, filed on Feb. 15, 2002.

(51) Int. Cl.
*H01M 4/58* (2006.01)
*H01M 4/50* (2006.01)
*H01M 4/02* (2006.01)

(52) U.S. Cl. .............. 429/231.1; 429/224; 429/231.95; 429/231.5; 429/209

(58) Field of Classification Search .......... 429/231.1, 429/209, 231.95
See application file for complete search history.

(56) References Cited

U.S. PATENT DOCUMENTS 5,196,279 A    3/1993   Tarascon
5,240,794 A    8/1993   Thackeray et al.
5,266,299 A   11/1993   Tarascon
5,783,333 A *  7/1998   Mayer ................ 429/223

FOREIGN PATENT DOCUMENTS

JP    06-333569    *  2/1994
JP    0849817 A2   * 12/1997

OTHER PUBLICATIONS

J. Electrochem Soc. vol. 145, No. 4, Apr. 1998, The Electrochemical Society, M.E. Spahr, P. Novak B. Snyder et al.
Chem. Lett, 8, 744-745 (2001), Ohzuku and Makimura, Dept. of Applied Chemistry, Osaka.
JCPDS-International Center for Diffraction Data in Powder Diffraction Files PDF-34-1292 and PDF-34-0653.

\* cited by examiner

*Primary Examiner*—Tracy Dove
*Assistant Examiner*—Helen O. Chu
(74) *Attorney, Agent, or Firm*—Olson & Cepuritis, Ltd; Harry M. Levy

(57) ABSTRACT

Lithium metal oxide compounds of nominal formula $Li_2MO_2$, in which M represents two or more positively charged metal ions, selected predominantly and preferably from the first row of transition metals are disclosed herein. The $Li_2MO_2$ compounds have a layered-type structure, which can be used as positive electrodes for lithium electrochemical cells, or as a precursor for the in-situ electrochemical fabrication of $LiMO_2$ electrodes. The $Li_2MO_2$ compounds of the invention may have additional functions in lithium cells, for example, as end-of-discharge indicators, or as negative electrodes for lithium cells.

29 Claims, 19 Drawing Sheets

LAYERED ELECTRODES FOR LITHIUM CELLS AND BATTERIES

RELATED APPLICATIONS

This application, pursuant to 37 C.F.R. 1.78(c), claims priority based on provisional application Ser. No. 60/357,393 filed on 15 Feb. 2002.

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

FIELD OF INVENTION

This invention relates to electrochemical cells and batteries and more particularly to positive and negative electrodes for non-aqueous lithium cells and batteries. The electrodes consist of lithium-metal oxide compounds of nominal formula $Li_2MO_2$ with a layered-type structure in which M is a metal cation, selected predominantly and preferably from the first row of transition metals. The dominant, but not exclusive, field of use for these electrodes is in lithium-ion batteries that are used widely for energy storage and for powering devices such as portable telecommunication equipment and computers, medical devices and electric- or hybrid-electric vehicles.

BACKGROUND OF THE INVENTION

Lithium transition metal oxides, particularly those with a layered-type structure, such as $LiCoO_2$, $LiNiO_2$, $LiMnO_2$ and $LiVO_2$ and analogues thereof, are of interest as positive electrodes for rechargeable lithium batteries. The best-known electrode material, $LiCoO_2$, is relatively expensive compared to the isostructural nickel and manganese-based compounds. Efforts are therefore being made to develop less costly electrodes, for example, by partially substituting the cobalt ions within $LiCoO_2$ by nickel, such as in $LiNi_{0.8}Co_{0.2}O_2$ or by exploiting a substituted system based on $LiMnO_2$. Such layered compounds are sometimes stabilized by partially replacing the transition metal cations within the layers by other metal cations, either alone or in combination. For example, $Li^+$ and/or $Mg^{2+}$ ions may be introduced into the structure to improve the electronic conductivity of the electrode, or $Al^{3+}$ or $Ti^{4+}$ ions to improve the structural stability of the electrode at high levels of delithiation. Examples of such compounds are $LiNi_{0.8}Co_{0.5}Al_{0.05}O_2$ and $LiNi_{0.75}Co_{0.15}Ti_{0.05}Mg_{0.05}O_2$.

Layered $LiMO_2$ compounds containing either Co or Ni (or both) as the transition metal cations, M, with an average trivalent oxidation state, are oxidized during cell charging to a tetravalent oxidation state. Such compounds are highly oxidizing materials and can react with the electrolyte or release oxygen. These electrode materials can, therefore, suffer from structural instability in the charged state when, for example, more than 50% of the lithium is extracted from their structures. Although the layered manganese compound $LiMnO_2$ has been successfully synthesized in the laboratory, it has been found that delithiation of the structure and subsequent cycling of the $Li_xMnO_2$ electrode in electrochemical cells causes a transition from a layered $MnO_2$ configuration to a 3-dimensional spinel-type $[Mn_2]O_4$ configuration. This transformation changes the voltage profile of the $Li/Li_xMnO_2$ cell such that it delivers capacity over both a 4V and a 3V plateau. Other types of $LiMnO_2$ structures exist, such as the orthorhombic-form, designated $o-LiMnO_2$, in which sheets of $MnO_6$ octahedra are staggered in zig-zig fashion unlike their arrangement in layered $LiMnO_2$. However, $o-LiMnO_2$ behaves in a similar way to layered $LiMnO_2$ in lithium cells; it also converts to a spinel-like structure on electrochemical cycling.

Lithium-ion cells, which contain the $LiMO_2$ electrodes described above are, in general, assembled in the discharged state to avoid safety problems and the inconvenience of handling charged electrode materials, such as lithiated graphite, and delithiated metal oxides, such as $Li_{1-x}CoO_2$ and $Li_{1-x}NiO_2$, which are highly reactive materials. However, a major disadvantage of lithium-ion cells is that all the lithium, which is transported between the positive and negative electrodes during charge and discharge is initially contained in the positive electrode, as in $LiCoO_2$. On the initial charge of a graphite/electrolyte/$LiCoO_2$ cell, some of the lithium that is deposited at the graphite electrode reacts with various chemical components in the cell: 1) the organic solvent of the electrolyte such as ethylene carbonate and dimethyl carbonate, 2) a component of the electrolyte salt such as the fluoride ion of $LiPF_6$, and 3) a trace amount of water in the electrolyte. These reactions form a passive, protective layer on the lithiated graphite particles, thereby preventing further reaction between the lithiated graphite electrode and the electrolyte. Consequently, the lithium in the protective layer is unavailable for further electrochemical reaction, and cannot be transported back to the delithated $Li_{1-x}CoO_2$ electrode during discharge of the cell, which results in an irretrievable capacity loss from the lithium-ion cell. Therefore, it stands to reason that positive electrodes that contain an excess of lithium can be used to compensate for the electrochemically inactive lithium at the negative electrode, thereby combating the capacity loss of lithium-ion cells.

This invention describes a new class of electrochemically active compounds having the nominal formula $Li_2MO_2$, in which M represents two or more positively charged metal ions and in which there is twice as much lithium as in $LiMO_2$ compounds, that can be used as electrodes to compensate for the capacity loss of conventional lithium-ion cells with electrodes, such as $LiCoO_2$, $LiNiO_2$, $LiMn_{0.5}Ni_{0.5}O_2$ or the like. The surplus lithium in the electrode can also be used to ensure that there is always sufficient lithium in fully charged $Li_{1-x}MO_2$ electrodes to prevent cells from being overcharged to obtain a required capacity, thereby minimizing the degradation of the electrode structure by loss of oxygen or by oxidation of the electrolyte. The $Li_2MO_2$ compounds can also be used to compensate for the capacity loss at the negative electrode when other positive electrodes are used, such as $Li_{1.03}Mn_{1.97}O_4$ spinel electrodes, or olivine-type electrodes such as $LiFePO_4$. The compounds of the invention have additional functions for lithium cells, for example, they can be used as end-of-discharge indicators, or as negative electrodes in lithium cells. The invention extends to methods for synthesizing the $Li_2MO_2$ compounds.

SUMMARY OF THE INVENTION

This invention relates to lithium-metal oxide compounds of nominal formula $Li_2MO_2$, in which M represents two or more positively charged metal ions, selected predominantly and preferably from the first row of transition metals. The $Li_2MO_2$ compounds of the invention have a layered-type structure, which is isostructural with $Li_2MnO_2$ and $Li_2NiO_2$ and can be used as positive electrodes for lithium electrochemical cells, and notably as a precursor for the in-situ electrochemical fabrication of $LiMO_2$ electrodes to minimize the electrochemical capacity loss of lithium-ion cells that use carbon (graphite) or intermetallic negative electrodes. The $Li_2MO_2$ compounds of the invention may have additional functions for lithium cells, for example, as end-of-discharge indicators, or as negative electrodes for lithium cells. The invention extends to methods for synthesizing the $Li_2MO_2$ electrodes, and to electrochemical cells and batteries incorporating such electrodes.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF THE PREFERRED EMBODIMENTS

This invention relates to lithium-metal-oxide electrode compounds, compositions and structures, the compounds having a nominal formula $Li_2MO_2$ in which M represents two or more positively charged ions, such that the average oxidation state of the M ions is +2. More specifically, the $Li_2MO_2$ compounds of the invention relate to their use as electrodes for non-aqueous lithium electrochemical cells and batteries.

The $Li_2MO_2$ electrodes of the invention have a layered-type structure that is isostructural with a) $Li_2MnO_2$, as reported by David et al. in Revue de Chemie Minerale, Volume t.20, page 636 (1984), and by Thackeray et al in U.S. Pat. No. 5,240,794 (31 Aug. 1993). and b) $Li_2NiO_2$ by Rieck et al. in Zeitschrift fur Anorganische und Allgemenie Chemie, Volume 392, page 193 (1972), and more recently by Dahn et al. in Solid State Ionics, Volume 44, page 87, (1990). $Li_{1+x}Mn_2O_4$ ($Li_yMnO_2$) spinel compounds have been disclosed by Tarascon in U.S. Pat. No. 5,196,279 (1993) and U.S. Pat. No. 5,266,299 (1993). Chalcogenide compounds, such as $Li_2VS_2$ and $Li_2VSe_2$ are known to have the $Li_2MO_2$ structure type as reported in the JCPDS—International Center for Diffraction Data in Powder Diffraction Files PDF-34-1292 and PDF-34-0653, respectively.

Figure 1:
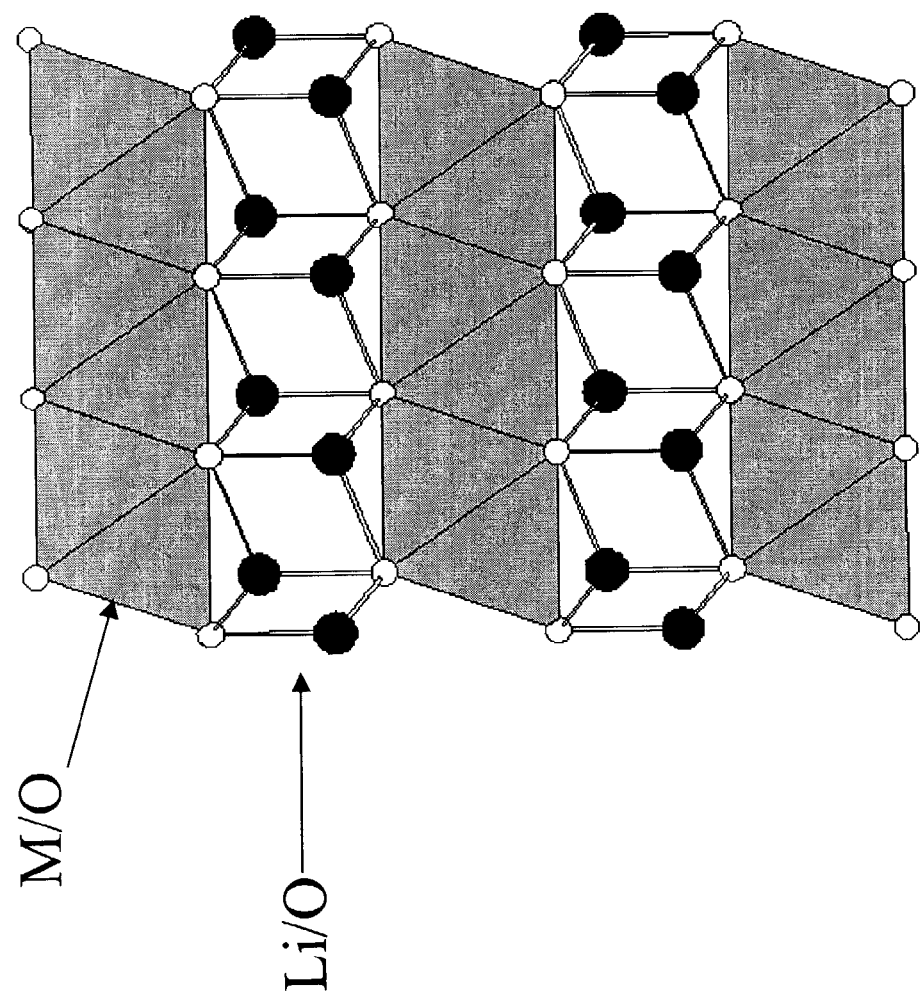
FIG. 1 depicts a schematic illustration of a $Li_2M'O_2$ structure.

In the ideal $Li_2MO_2$ structures of the invention, using $Li_2MnO_2$ as an example, the oxygen ions are arranged in a hexagonally-close-packed array, and are located at the (1/3, 1/3, z) positions of the unit cell (space group P-3m1); the Mn ions are located in octahedral sites at the crystallographic positions (0, 0, 0) and the Li ions are located in tetrahedral sites at the (2/3, 1/3, z) positions of the unit cell. For $Li_2MnO_2$, the z coordinates of the 0 and Li ions have been reported by David et al. to be 0.39 and 0.25, respectively. The M ions occupy all the octahedra in alternate layers (between the close-packed oxygen ions), and the lithium ions reside in all the tetrahedral sites of the adjacent layers. A schematic illustration of a $Li_2MO_2$ structure is provided in FIG. 1; it is closely related to the $Ni(OH)_2$ (alternatively $H_2NiO_2$) structure.

To those skilled in the art, it can be readily understood that the crystal symmetry of other $Li_2MO_2$ compounds need not necessarily be exactly the same as that of $Li_2MnO_2$, and that crystallographic deviations from the prototypical symmetry can be expected. For example, although Rieck et al. have defined the crystal symmetry of $Li_2NiO_2$ in terms of a tetragonal unit cell, the overall structural features of $Li_2NiO_2$ and $Li_2MnO_2$ are essentially the same, particularly with respect to the coordination of the individual ions in the structure. Furthermore, it can be easily understood that the $Li_2MO_2$ compounds of the invention need not have the precise $Li_2MO_2$ stoichiometry, that is, they may be non-stoichiometric compounds with cation or anion vacancies, typically with a lithium (or M) deficiency, such as $Li_{1-\delta}MO_2$, or $Li_2MO_{2+\delta}$, where $\delta$ can fall typically within the range $0 \leq \delta \leq 0.2$; in addition; the compounds may not have an ideal layered configuration, that is, some of the lithium ions may occupy the M layers, and vice-versa, to the extent of 20 atom percent or less.

Therefore, in a first embodiment, the invention relates to an electrode for a non-aqueous lithium electrochemical cell, comprising of a lithium-metal oxide compound having a layered $Li_2MO_2$ structure in which M is selected from two or more positively charged metal ions with an atomic number less than 51. The M cations of the $Li_2MO_2$ compounds are selected preferably from family of transition metal elements in the periodic table, more preferably from the first row of transition metal elements, particularly from Ti, V, Cr, Fe, Mn, Co, Ni and Cu, and most preferably from Mn and Ni.

Figure 2:
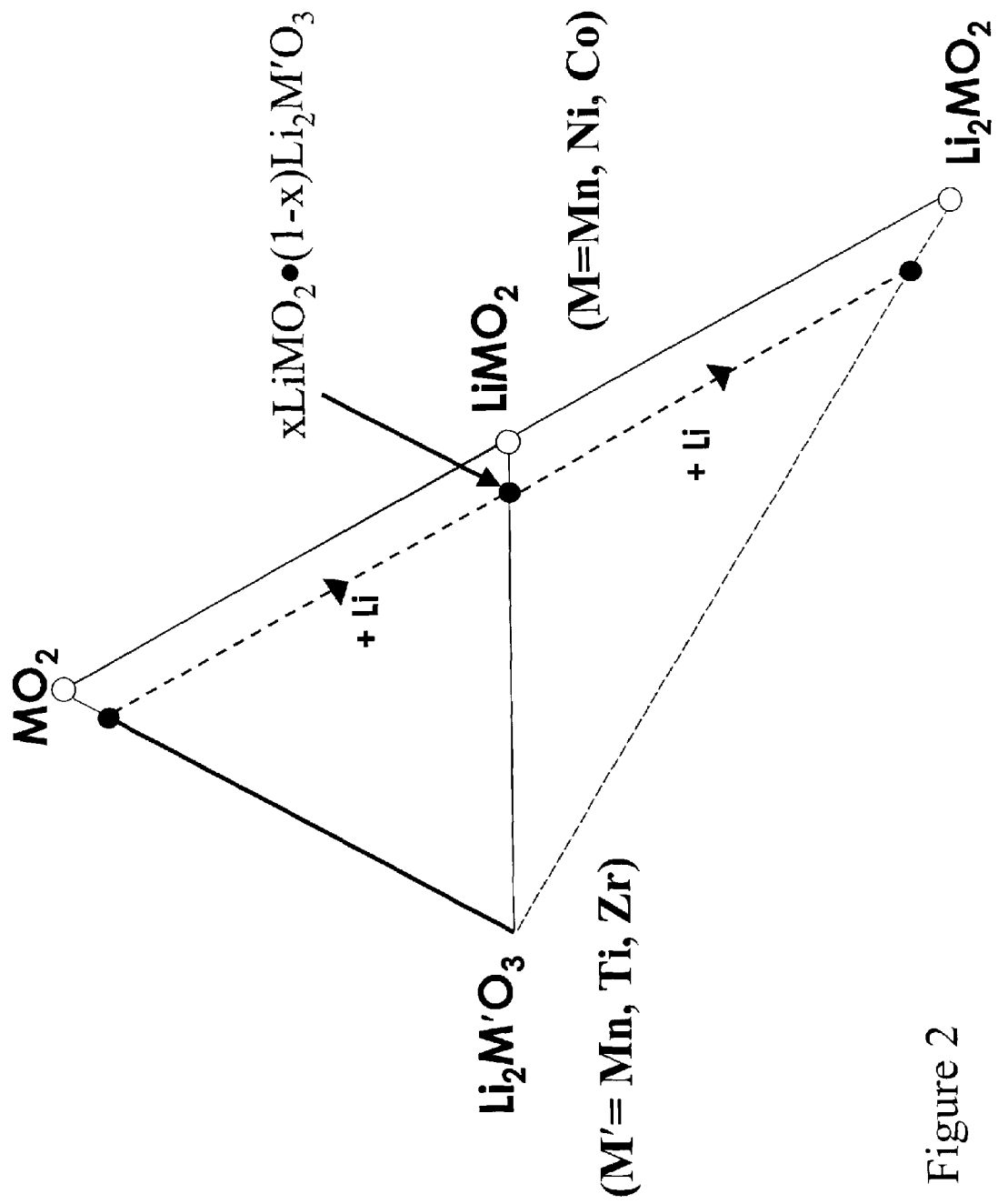
FIG. 2 depicts a schematic representation of a $M'O_2$—$Li_2M'O_2$—$Li_2M'O_3$ compositional phase diagram.

The M cations can in some instances be partially substituted by lithium ions. For example, there exist not only layered rocksalt structures with a $LiMO_2$ composition but also a $Li_2MO_3$ composition that can be normalized in the $LiMO_2$ notation as $Li[Li_{1/3}M_{2/3}]O_2$. Examples of such $Li_2MO_3$ compounds are $Li_2TiO_3$, $Li_2MnO_3$, $Li_2ZrO_3$, $Li_2RuO_3$ or, alternatively, $Li[Li_{1/3}Ti_{2/3}]O_2$, $Li[Li_{1/3}Mn_{2/3}]O_2$, $Li[Li_{1/3}Zr_{2/3}]O_2$ and $Li[Li_{1/3}Sn_{2/3}]O_2$, respectively. Therefore, it stands to reason that the layered $Li_2MO_2$ electrodes of this invention may be derived from either a solid solution of $LiMO_2$ and $Li_2MO_3$ compounds, or they may be derived from a composite structure with interconnected domains or regions of $LiMO_2$ and $Li_2MO_3$ structural components. These compounds are represented generically herein as $xLiMO_2 \cdot (1-x)Li_2MO_3$ compounds, in which M' is used to distinguish the M cations from the M' cations in the $LiMO_2$ and $Li_2M'O_3$ components, respectively. Such a relationship in layered compounds is depicted schematically in a $MO_2$—$Li_2MO_2$—$Li_2M'O_3$ compositional phase diagram in FIG. 2 in which the $LiMO_2$—$Li_2M'O_3$ tie-line represents the range of $xLiMO_2 \cdot (1-x)Li_2MO_3$ compounds, the components of which can share a common close-packed oxygen array. In a preferred embodiment, the $Li_2MO_2$ compounds of the invention are derived from a $xLiMO2 \cdot (1-x)Li_2M'O_3$ solid solution or composite structure in which M' is selected from one or more of Ti, Mn, Zr, Ru and Sn.

The changes in composition of a $LiMO_2$ electrode during the electrochemical insertion and extraction of lithium is represented by the $MO_2$—$LiMO_2$—$Li_2MO_2$ tie-line in the $MO_2$—$Li_2MO_2$—$Li_2M'O_3$ phase diagram. When the $Li_2MO_2$ compounds of this invention are used as the precursor electrodes of an electrochemical lithium cell, then taking the compound $LiNi_{0.5}Mn_{0.5}O_2$ as an example (in which M=0.5Mn+0.5Ni), lithium extraction from $LiNi_{0.5}Mn_{0.5}O_2$ may be written as:

$$Li_2(Ni_{0.5}Mn_{0.5})O_2 \rightarrow Li(Ni_{0.5}Mn_{0.5})O_2 + Li \rightarrow \sim (Ni_{0.5}Mn_{0.5})O_2 + Li \quad (1)$$

in which ~ represents a lithium vacancy. In this example, the two sequential reactions, 1a and 1b, represent the two successive reactions that occur between approximately 1.2 and 4.6 V versus metallic Li. The reactions are reversible. The theoretical electrode capacity for both reactions is 560 mAh/g, 280 mAh/g of which is delivered by reaction 1a that involves a two-electron transfer process associated with a $Mn^{4+/2+}$ redox couple; the remaining 280 mAh/g is delivered by a two-electron transfer process associated with a $Ni^{4+/2+}$ redox couple. In this reaction, however, it is possible that some disorder between the M and Li cations may occur during electrochemical cycling through a partial filling of the Li vacancies ~ by the M cations. Such disorder would redistribute some of the Ni and/or Mn ions on the lithium sites, thereby affecting the ease by which the ideal $Li_2MO_2$ phase would form. The applicants believe that the addition of some surplus lithium in the M layers, as is achieved in $xLiMO_2 \cdot (1-x)Li_2MO_3$ composite structures may suppress the migration of the M cations to the Li layers, thereby reducing the possibility of disorder in the electrode structure. In a further embodiment, the invention therefore includes $Li_2MO_2$ electrodes in which the M and Li ions are at least partially disordered over the M and Li crystallographic sites of the $Li_2MO_2$ structure.

At the extreme end of discharge of $Li/Li_xMO_2$ cells, it is possible that M cations can be extruded from the structure when x approaches or exceeds the value of 2. Thus in the example provided by Reaction 1, when the cell voltage approaches 1 V, some metal displacement, such as Ni extrusion, may occur from the structure as proposed in Reaction (2):

$$Li_2(Ni_{0.5}Mn_{0.5})O_2 + Li \rightleftharpoons 0.5\ Ni + \text{"Li}_3Mn_{0.5}O_2\text{"} \quad (2)$$

in which nickel extrusion leaves a residual "$Li_3Mn_{0.5}O_2$" component, the precise constitution and structural details of which are not yet known. This reaction provides additional capacity to the cell, the theoretical electrode capacity being 261 mAh/g. In practice, however, this reaction is only partially reversible and damages the structural integrity and reversibility of the $Li_2(Ni_{0.5}Mn_{0.5})O_2$ ($Li_2MO_2$) electrode.

In another embodiment of the invention, the M ions in the $Li_2MO_2$ structure may not only be partially replaced by monovalent lithium ions as previously described, but also by multivalent non-transition metal cations with an atomic number less than 51 such as $Mg^{2+}$, $Al^{3+}$ and $Sn^{4+}$ to impart improved structural stability or electronic conductivity to the electrode during electrochemical cycling. Furthermore, because the electrolytes of lithium-ion cells, such as $LiPF_6$ dissolved in a 1:1 mixture of ethylene carbonate and dimethyl carbonate, are known to contain acidic species such as HF, the lithium ions of the $Li_2MO_2$ electrode may be partially replaced by $H^+$ ions derived from the electrolyte by ion-exchange with the $Li^+$ ions. In a further embodiment of the invention, therefore, the lithium ions of the $Li_2MO_2$ electrodes may be at least partially ion-exchanged with hydrogen ions.

In another embodiment of the invention, the $Li_2MO_2$ compounds can be used as a precursor for the electrochemical fabrication of $LiMO_2$ positive electrodes for an electrochemical cell, particularly those with a layered structure such as $LiNi_{0.5}Mn_{0.5}O_2$ Layered $LiMO_2$ electrode structures are to be preferred over other structural types, such as spinel-related $LiMnO_2$ ($Li_2[Mn_2]O_4$) because there is a very strong structural relationship between layered $Li_2MO_2$ and layered $LiMO_2$ compounds. In this respect, an ideal layered-$Li_2MO_2$ to layered-$LiMO_2$ two-phase transition involves 1) the extraction of one-half of the lithium ions from the tetrahedral sites that leaves the residual lithium ions in all the octahedral sites of the same layer, 2) small displacements of the oxygen ions that slide from the hexagonally-close-packed (hcp) ABABAB sequence in $Li_2MO_2$ to a cubic-close-packed (ccp) ABCABC sequence in $LiMO_2$, and 3) small displacements of the nickel atoms in their layers to maintain an octahedral coordination with the oxygen ions. By contrast, a layered-$Li_2MO_2$ (hcp) to spinel-$LiMO_2$ (ccp) transition necessitates the displacement of one-quarter of the M ions into the Li layers and vice-versa, making this transition thermodynamically and kinetically more difficult.

The high content of lithium in $Li_2MO_2$ electrodes can be used to offset the loss in capacity that is usually encountered in lithium-ion cells, as described previously herein. For example, the layered $Li_2MO_2$ can act as a precursor for the in-situ electrochemical fabrication or formation of $LiMO_2$ electrodes to minimize the electrochemical capacity loss of lithium-ion cells that use, for example, carbon, a metal, a metal oxide, a metal nitride, or an intermetallic compound as negative electrodes, specific examples of such negative electrodes being graphite, $SnO_2$, $Sn_3N_4$, Al, $Cu_6Sn_5$ and $Cu_2Sb$. The $Li_2MO_2$ electrodes may be used either on their own as the only positive electrode material in the cells or, alternatively, they may be blended or mixed together with one or more secondary positive electrode materials for an electrochemical cell, for example those with a layered structure, a spinel-type structure, or an olivine-type structure. Examples of layered electrodes are $LiCoO_2$, $LiNiO_2$, $LiMnO_2$, $LiMn_{0.5}Ni_{0.5}O_2$, $LiMn_{1/3}Ni_{1/3}Co_{1/3}O_2$, $LiNi_{0.8}Co_{0.15}Al_{0.05}O_2$ and $LiNi_{0.75}Co_{0.15}Ti_{0.05}Mg_{0.05}O_2$, whereas typical spinel-type electrodes are found within the system $Li_{1+x}Mn_{2-x}O_4$ (0<x<0.33). Examples of olivine-type electrodes are $LiFePO_4$, $LiMnPO_4$ and $LiCoPO_4$.

The $Li_2MO_2$ electrodes of this invention, such as $Li(Mn_{0.5}Ni_{0.5})O_2$, tend to have low electronic conductivity. Therefore, in a further embodiment of the invention, the $Li_2MO_2$ electrodes may by coated with an electronic conductor, such as carbon, to improve current collection at the particle surface, or they may be mixed with an electronic conductor, such as acetylene black powder to improve the electronic conductivity of the overall electrode.

In another embodiment of this invention, because the $Li_2MO_2$ compounds provide an electrochemical potential below that of typical state of the art the layered $LiMO_2$ electrodes, such as $LiCoO_2$, spinel-type electrodes, such as $LiMn_2O_4$, and olivine-type electrodes, such as $LiFePO_4$, the $Li_2MO_2$ compounds can be conveniently used as end-of-discharge indicators for lithium cells.

Although the $Li_2MO_2$ electrodes of this invention will have preferred use as positive electrodes in lithium-ion cells, for example with graphite negative electrodes, the $Li_2MO_2$ electrodes can also be used alternatively as negative electrodes in lithium electrochemical cells. For example, when $Li(Mn_{0.5}Ni_{0.5})O_2$ is used as the positive $LiMO_2$ electrode, it can also be used as the negative electrode. In such an instance, the lithium-ion cell has the symmetric configuration $Li(Mn_{0.5}Ni_{0.5})O_2$/electrolyte/$Li(Mn_{0.5}Ni_{0.5})O_2$. The pertinent idealized electrochemical reactions for such a symmetric cell for complete lithium insertion and extraction are:

Initial charge:

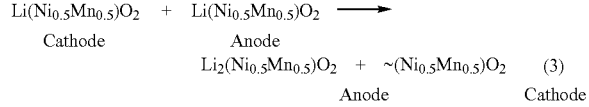

Subsequent cycling:

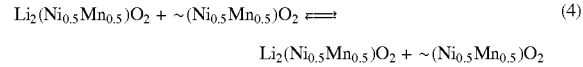

During charge, lithium ions are extracted from the cathode to generate a $\sim(Ni_{0.5}Mn_{0.5})O_2$ composition, while lithium ions are inserted into the anode to generate $Li_2(Mn_{0.5}Ni_{0.5})O_2$. The reaction at the cathode in Reaction 3 is ideal because, in practice, it is not possible to extract all the lithium from the $Li(Ni_{0.5}Mn_{0.5})O_2$ electrode, and charged electrodes are usually restricted to a composition close to $Li0.5\sim_{0.5}(Ni_{0.5}Mn_{0.5})O_2$. Such symmetric cells, are assembled in a neutral, discharged state and the fully charged $Li_2(Mn_{0.5}Ni_{0.5})O_2$ anode is generated electrochemically from a discharged $Li(Mn_{0.5}Ni_{0.5})O_2$ anode. Note that when $Li_2(Mn_{0.5}Ni_{0.5})O_2$ is used as a cathode for a typical lithium-ion cell with a graphite or carbon anode, the lithium-ion cell would be assembled in an overdischarged state, with the configuration C(graphite)leiectrolyte/$Li_2(Mn_{0.5}Ni_{0.5})O_2$.

Such symmetrically designed $Li(Mn_{0.5}Ni_{0.5})O_2$/electrolyte/$Li(Mn_{0.5}Ni_{0.5})O_2$ cells should provide superior safety characteristics to conventional lithium-ion cells because the anode contains neither metallic lithium nor lithiated graphite as all the lithium available for cycling is made available by two metal oxide electrodes that operate well above the potential of metallic lithium or lithiated graphite electrodes. This type of cell provides an average voltage of approximately 2.2 V, and has the unique feature of being able to undergo polarity switching that protects the electrodes from overcharge/overdischarge reactions and allows equivalent cycling in a negative voltage range.

In a further embodiment of the invention, the $Li_2MO_2$ compounds can be synthesized by various methods. For example, the compounds may be synthesized electrochemically, in situ, by lithium insertion into a lithium metal oxide electrode precursor containing the M cations, such as layered $LiMO_2$ or $LiM_2O_4$ spinel-type electrodes in electrochemical lithium cells, using optionally, an aliquot of sacrificial lithium metal or lithium alloy layer or coating on the negative electrodes of the cells. Alternatively, the $Li_2MO_2$ compounds may be formed by chemical reactions, for example by the reaction of a suitable lithiating agent, such as metallic lithium, vapor-deposited lithium, n-butyl-lithium, lithium napthalide ($Li\{C_{10}H_8\}$), lithium dissolved in ammonia or the like, with a lithium metal oxide electrode precursor containing the M cations, such as layered $LiMO_2$ or $LiM_2O_4$ spinel-type precursors. Alternatively, the $Li_2MO_2$ compounds may be formed by ion exchange from a $M(OH)_2$ precursor with a suitable lithiating agent, such as LiBr or LiCl dissolved in hexanol.

The following examples describe the principles of the invention as contemplated by the inventors, but they are not to be construed as limiting examples:

EXAMPLE 1

Figure 3:
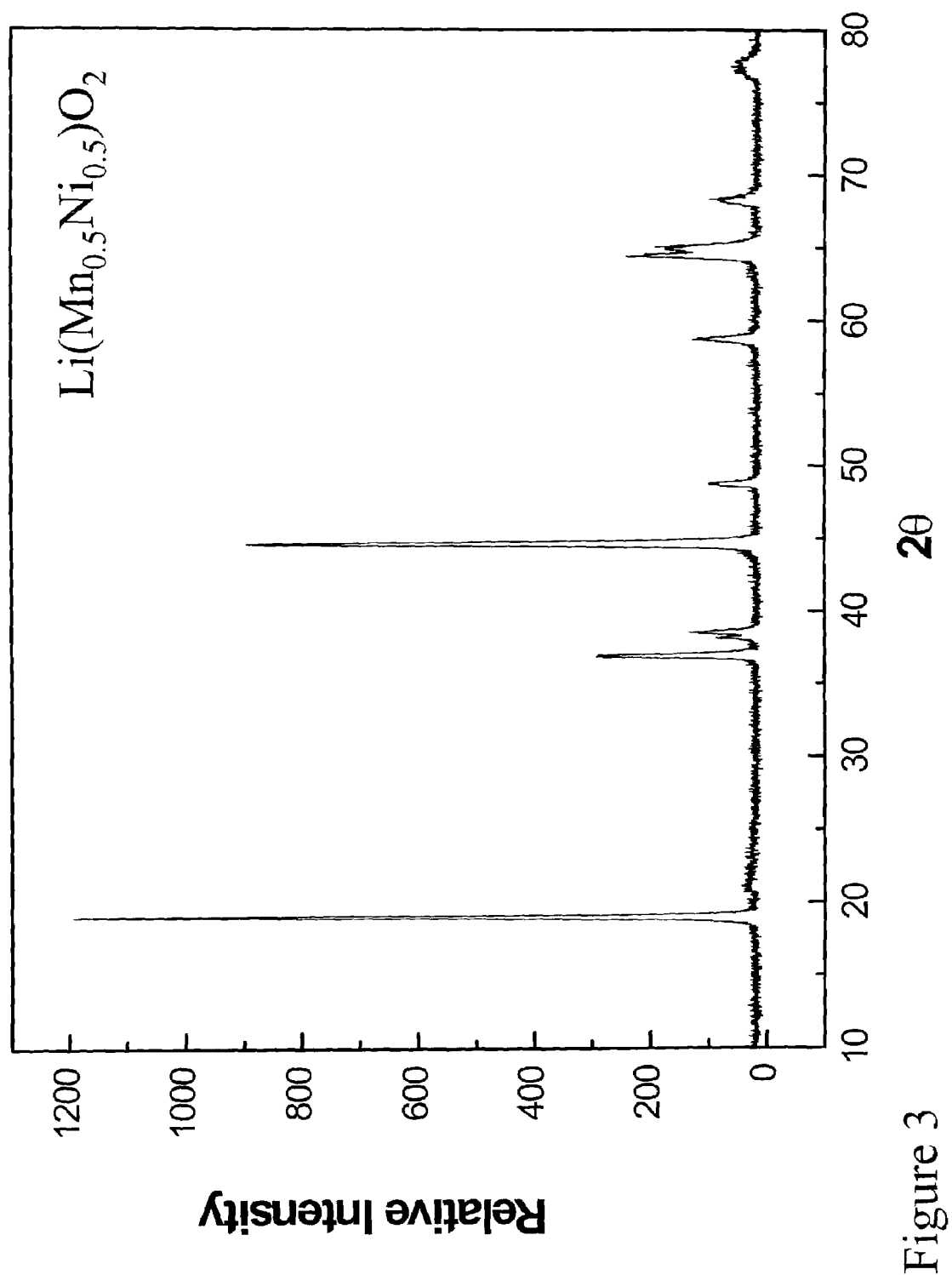
FIG. 3 depicts the X-ray diffraction pattern of the electrode precursor $Li(Mn_{0.5}Ni_{0.05})O_2$.

A $Mn_{0.5}Ni_{0.5}(OH)_2$ reagent was prepared by precipitation from $Ni(NO_3)_2$ and $Mn(NO_3)_2$ in basic solution (NaOH, pH~11). The electrode precursor material $Li(Mn_{0.5}Ni_{0.5})O_2$ was prepared by the reaction of the $Mn_{0.5}Ni_{0.5}(OH)_2$ reagent with $LiOH.H_2O$ in the required stoichiometric amounts in pelletized form, first at 480° C. for 12 hours and thereafter at 950° C. for 10 hours. The sample was then quenched in air to room temperature and ground into a powder. The powder X-ray diffraction pattern of the final $Li(Mn_{0.5}Ni_{0.5})O_2$ product is shown in FIG. 3.

EXAMPLE 2

Figure 4:
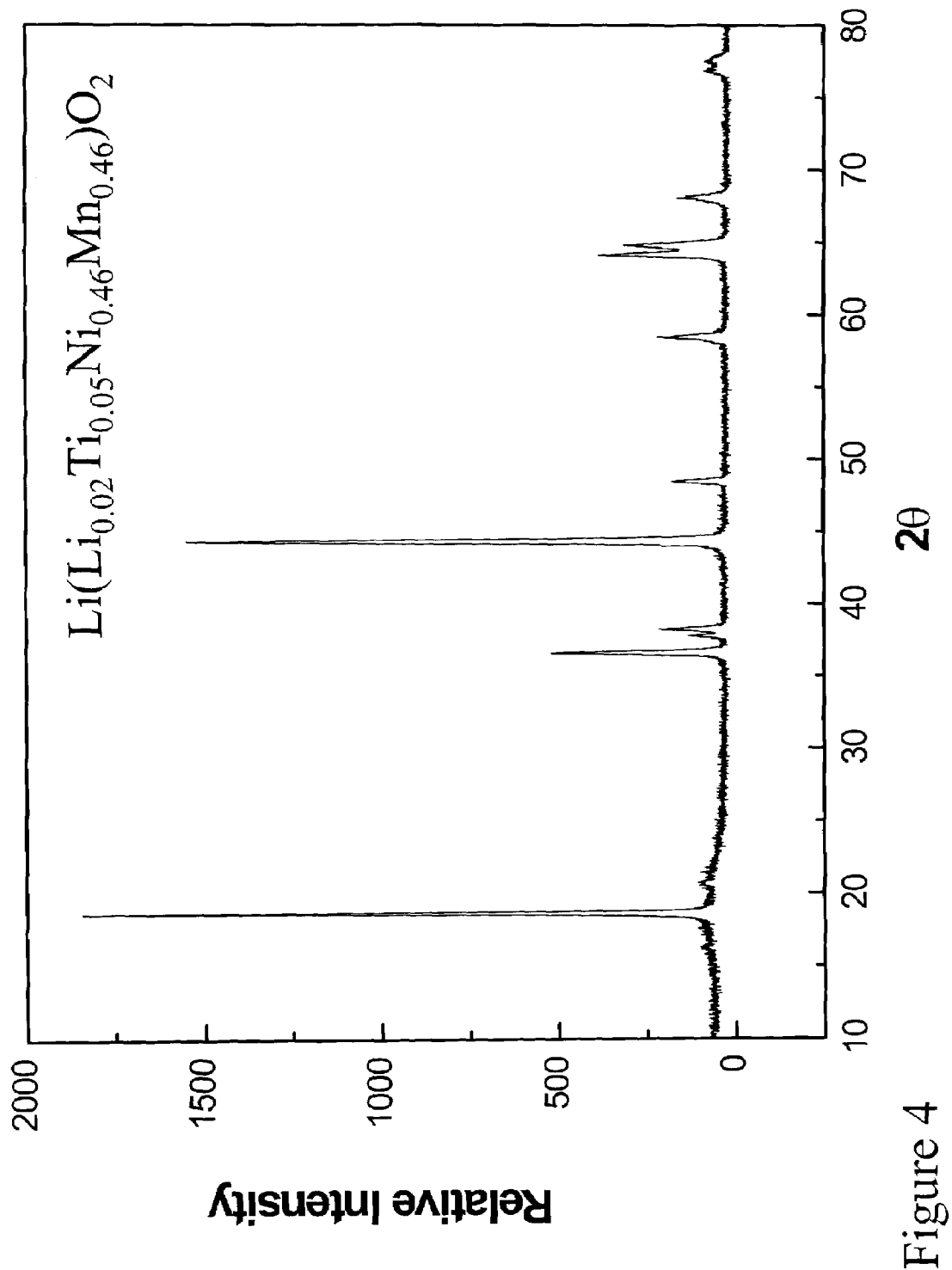
FIG. 4 depicts the X-ray diffraction pattern of the electrode precursor $Li(Li_{0.02}Ti_{0.05}Ni_{0.46}Mn_{0.46})O_2$.

The electrode precursor material $Li(Li_{0.02}Ti_{0.05}Ni_{0.46}Mn_{0.46})O_2$ that can be written, alternatively, as $0.05Li_2TiO_3.0.95LiNi_{0.5}Mn_{0.5}O_2$ was prepared by the reaction of $Ni_{0.5}Mn_{0.5}(OH)_2$ and $Ti[OCH(CH_3)_2]_4$ in the required stoichiometric amounts, together with a slight molar excess of LiOH (typically 3%) at 900° C. in air for 20 hours or less. The powder X-ray diffraction pattern of this compound, shown in FIG. 4, indicates an essentially single-phase product with a layered-type structure.

EXAMPLE 3

Figure 5:
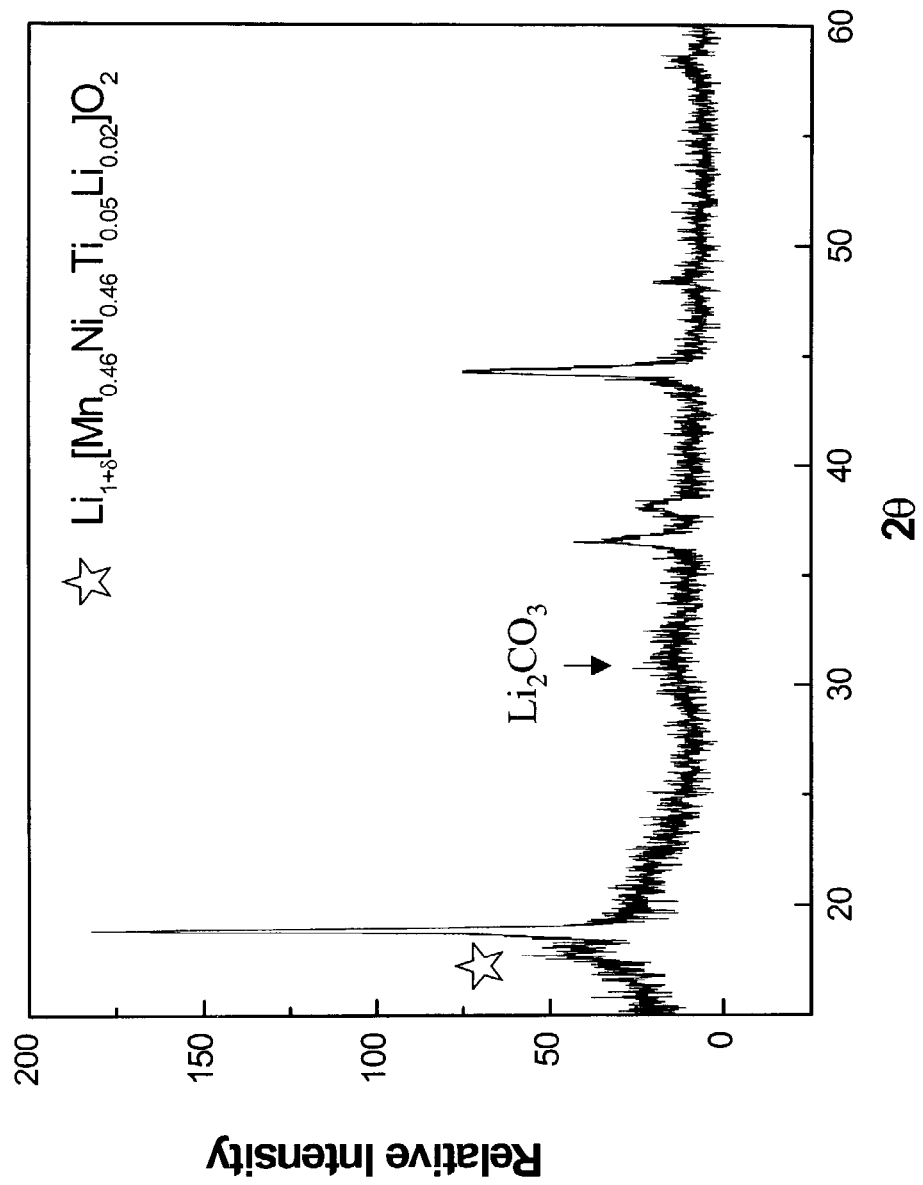
FIG. 5 depicts the X-ray diffraction pattern of a chemically lithiated product $Li_{1+d}(Li_{0.02}Ti_{0.05}Ni_{0.46}Mn_{0.46})O_2$ for $\delta \approx 1$.

A Li(Li$_{0.02}$Ti$_{0.05}$Ni$_{0.46}$Mn$_{0.46}$)O$_2$ product from Example 2 was reacted with a five-fold excess of n-butyl-lithium at 50° C. under nitrogen for three days. The X-ray diffraction pattern of the two-phase product consisting of unreacted Li(Li$_{0.02}$Ti$_{0.05}$Ni$_{0.46}$Mn$_{0.46}$)O$_2$ and a Li$_{1+\delta}$(Li$_{0.02}$Ti$_{0.05}$Ni$_{0.46}$Mn$_{0.46}$)O$_2$ ($\delta\approx1$) product is shown in FIG. 5, the Li$_{1+\delta}$(Li$_{0.02}$Ti$_{0.05}$Ni$_{0.46}$Mn$_{0.46}$)O$_2$ (d)>>1) product being in accordance with the principles of this invention. The relatively low concentration of the lithiated Li$_{1+d}$(Li$_{0.02}$Ti$_{0.05}$Ni$_{0.46}$Mn$_{0.46}$)O$_2$ phase in the sample was attributed to its high reactivity and its fast rate of decomposition when exposed briefly to air during the X-ray data collection.

EXAMPLE 4

A Li(Mn$_{0.5}$Ni$_{0.05}$)O$_2$ product from Example 1 was reacted chemically with a 50% mole excess of 0.1 M lithium naphthalide solution that had been freshly prepared from naphthalene and metallic lithium in tetrahydrofuran solvent at room-temperature for 24 h. The X-ray diffraction pattern of the two-phase product, consisting of unreacted Li(Mn$_{0.5}$Ni$_{0.5}$)O$_2$ and a Li$_{1+\delta}$(Mn$_{0.5}$Ni$_{0.5}$)O$_2$ ($\delta\approx1$) product, that was protected from air under beryllium foil during data collection is shown in FIG. 6(a), the Li$_{1+\delta}$(Mn$_{0.5}$Ni$_{0.5}$)O$_2$ ($\delta\approx1$) product being in accordance with the principles of this invention.

Figure 6:
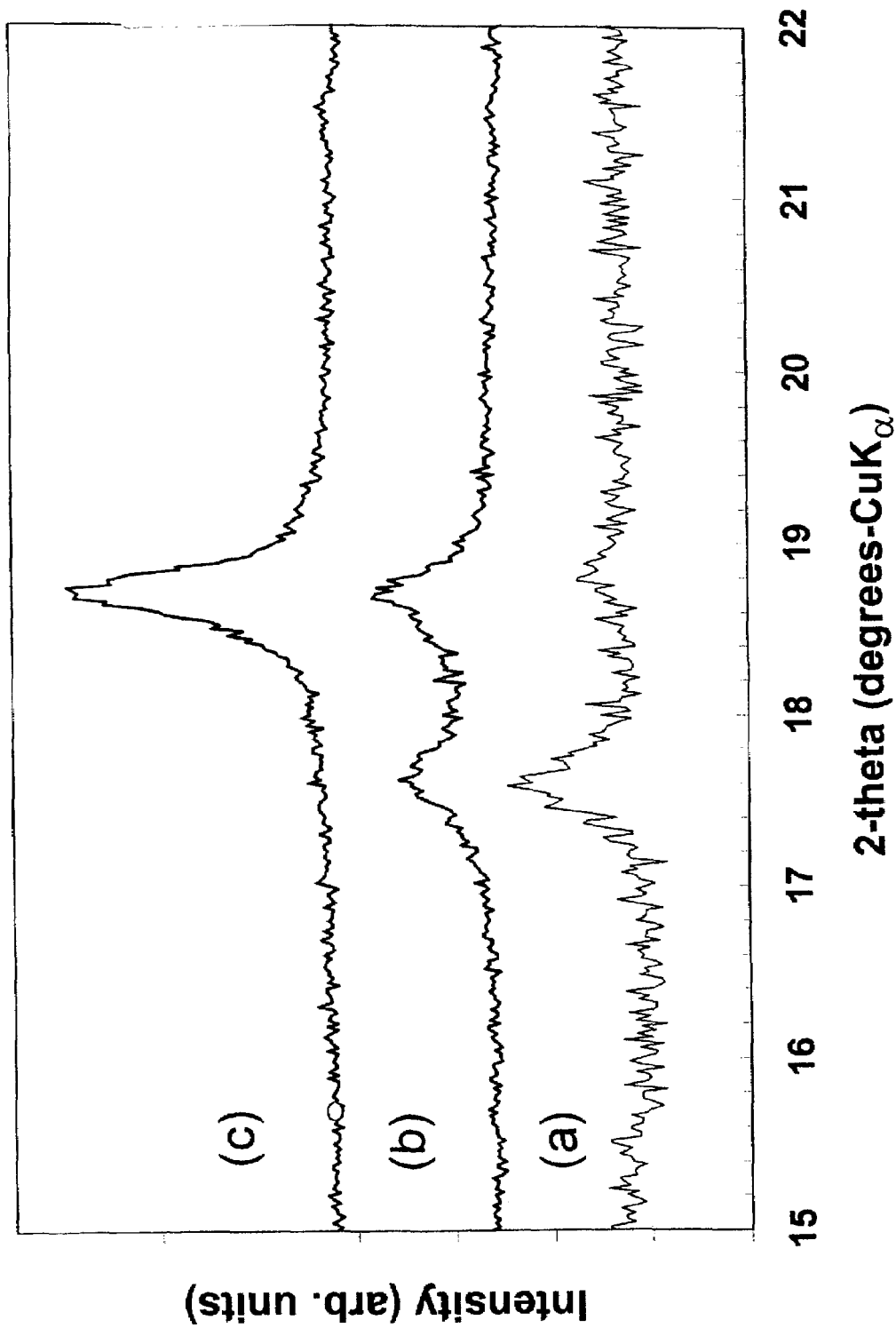
FIG. 6 depicts the X-ray diffraction pattern of (a) a chemically lithiated product $Li_{1+d}(Mn_{0.5}Ni_{0.5})O_2$ for $\delta \approx 1$ (b) and (c) the $Li_{1+d}(Mn_{0.5}Ni_{0.5})$ product after standing for 2 and 10 hours respectively.

When exposed to air, it is believed that lithium ions diffuse rapidly from the bulk of the Li$_{1+\delta}$(Mn$_{0.5}$Ni$_{0.5}$)O$_2$ structure to the particle surface to react with carbon dioxide and oxygen in the air to form Li$_2$CO$_3$, leaving behind a compound that closely resembles the parent Li(Mn$_{0.5}$Ni$_{0.5}$)O$_2$ structure, as shown by the X-ray diffraction patterns in FIG. 6(b) (recorded after standing for 2 hours in air) and FIG. 6(c) (recorded after standing for 10 hours in air). The structural instability of Li$_{1+\delta}$(Li$_{0.02}$Ti$_{0.05}$Ni$_{0.46}$Mn$_{0.46}$)O$_2$ ($\delta\approx1$) product of Example 3 and the Li$_{1+d}$(Mn$_{0.5}$Ni$_{0.5}$)O$_2$ (1) product of Example 4 in air is consistent with the previously reported behavior of Li$_2$MnO$_2$ and Li$_2$NiO$_2$ compounds.

EXAMPLE 5

Figure 7:
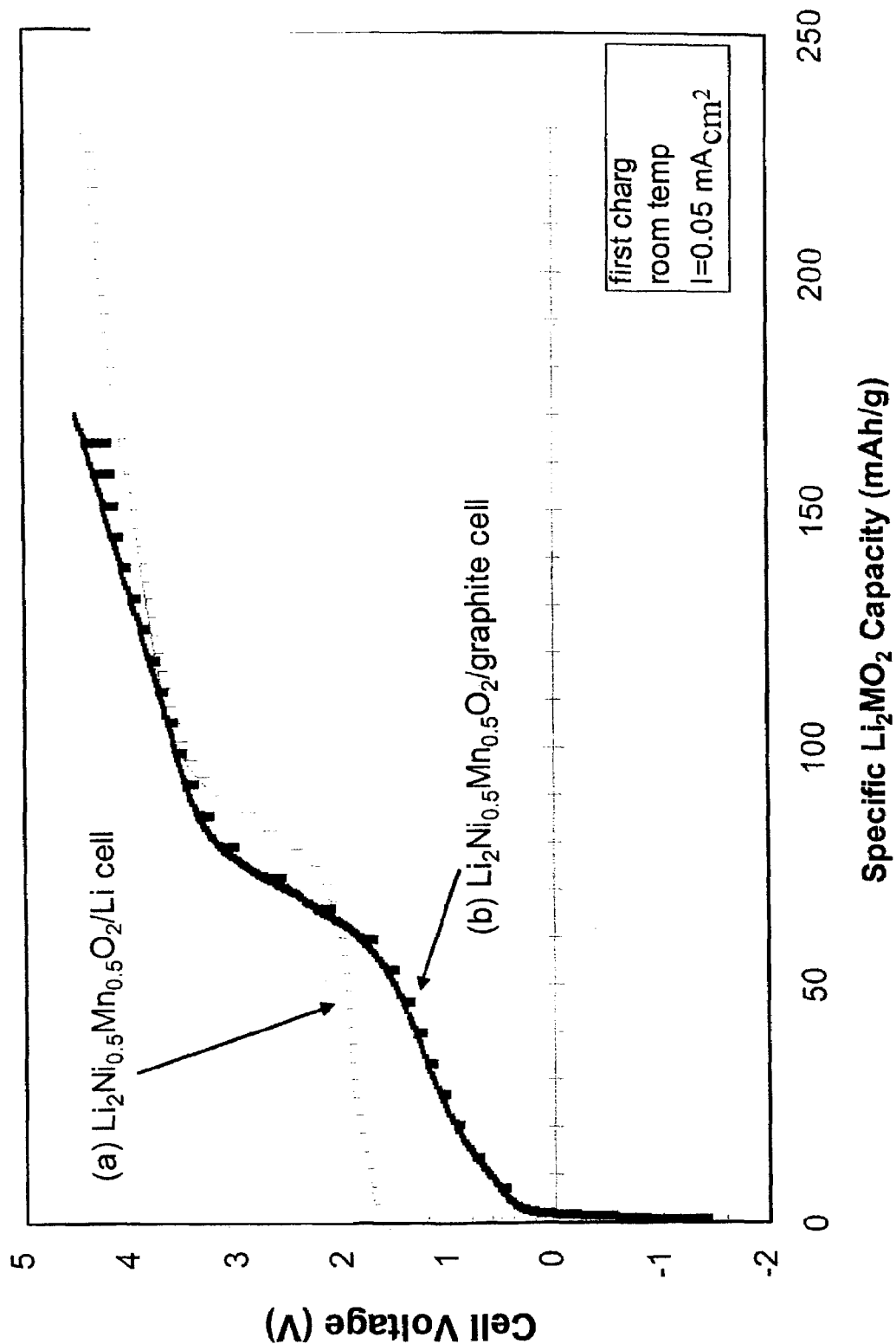
FIG. 7 depicts the voltage profile of (a) a Li/electrolyte/$Li_2(Mn_{0.5}Ni_{0.5})O_2$ cell, and (b) a C(Graphite)/electrolyte/$Li_2(Mn_{0.5}Ni_{0.5})O_2$ cell during the initial charge to 4.5 V.

The Li$_{1+\delta}$(Mn$_{0.5}$Ni$_{0.5}$)O$_2$ ($\delta\approx1$) compound in Example 4 was used to fabricate electrodes for coin cells (size 2032) i.e, 20 mm diameter and 3.2 mm high against a counter electrodes consisting of metallic lithium electrode or a graphite laminate electrode. These cells have the configuration: Li/1M LiPF$_6$ in ethylene carbonate (EC), diethyl carbonate (DEC) (1:1) electrolyte/Li$_{1+\delta}$(Mn$_{0.5}$Ni$_{0.5}$)O$_2$ ($\delta\approx1$) or C (graphite)/1M LiPF$_6$ in ethylene carbonate (EC), diethyl carbonate (DEC) (1:1) electrolyte/Li$_{1+\delta}$(Mn$_{0.5}$Ni$_{0.5}$)O$_2$ ($\delta\approx1$). Electrode pellets contained approximately 6 to 11 mg of the Li$_{1+\delta}$(Mn$_{0.5}$Ni$_{0.5}$)O$_2$ ($\delta\approx1$) powder, i.e., approximately 83% by weight of the electrode, intimately mixed with approximately 9% by weight of a polyvinylidene difluoride (Kynar PVDF polymer) binder and approximately 8% by weight of a suitable carbon (i.e. graphite, such as Timcal SFG-6, or acetylene black, such as Chevron XC-72) in 1-methyl-2-pyrrolidinone (NMP). The slurries were painted, dried and pressed as a pellet onto a stainless steel or aluminum mesh grid. The electrodes were dried under vacuum at approximately 70° C. for 12 hours. The Li/Li$_{1+\delta}$(Mn$_{0.5}$Ni$_{0.5}$)O$_2$ ($\delta\approx1$) and C(graphite)/Li$_{1+\delta}$(Mn$_{0.5}$Ni$_{0.5}$)O$_2$ ($\delta\approx1$) cells were charged at a constant current of 0.05 mA/cm$^2$ from their initial open circuit (OCV) values to 4.5 V, the initial voltage profiles of which are shown in FIGS. 7(a) and 7(b) respectively. These profiles demonstrate the utility of the Li$_2$MO$_2$ electrodes of this invention, particularly with respect to the electrochemical capacity that can be delivered by the electrodes between 0 and 2 V during the initial charge of the cells.

EXAMPLE 6

Figure 8:
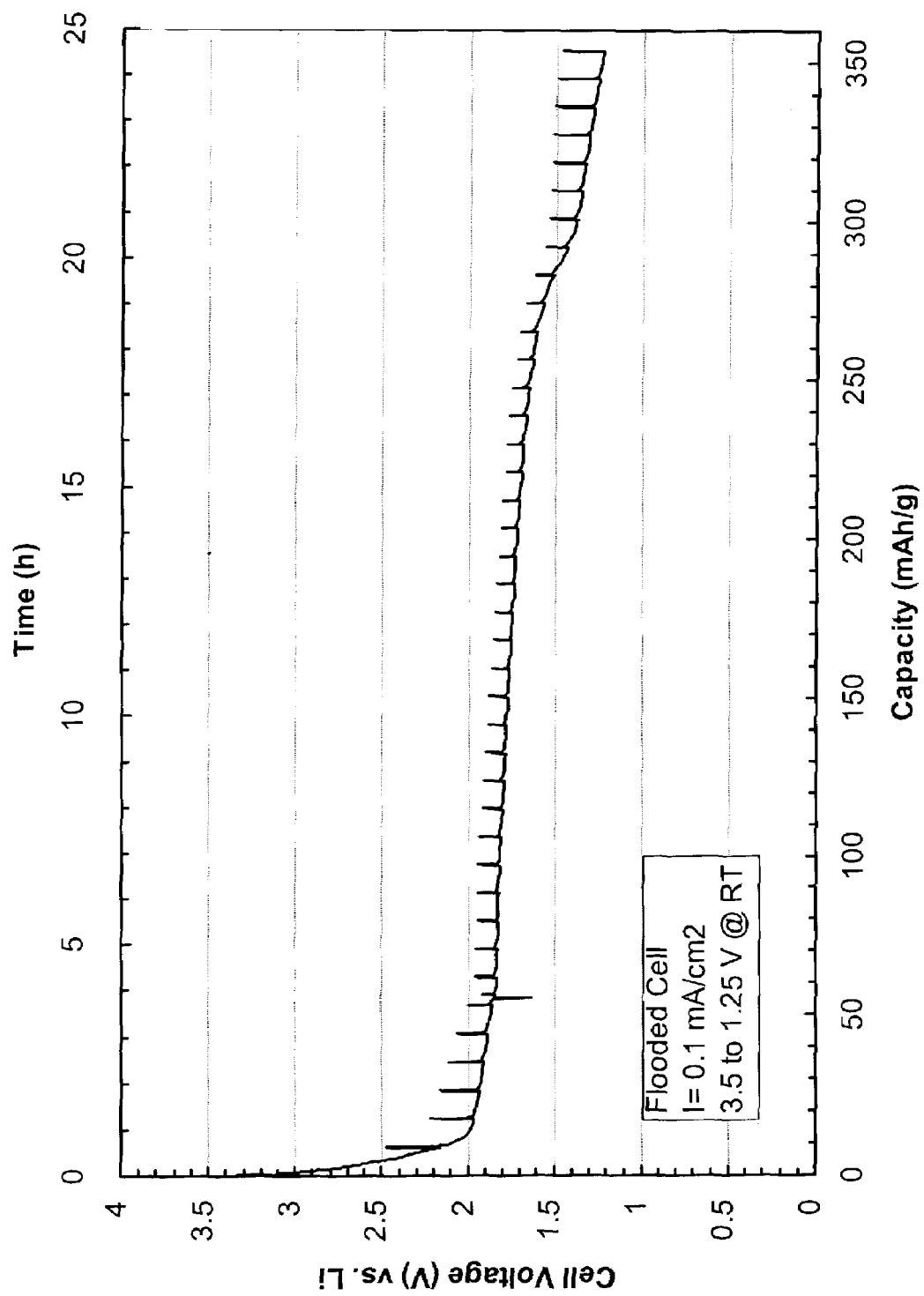
FIG. 8 depicts the initial electrochemical discharge profile of a Li/electrolyte/$Li(Li_{0.02}Ti_{0.05}Ni_{0.46}Mn_{0.46})O_2$ electrochemical cell between 3.5 V and 1.25 V.

The Li(Li$_{0.02}$Ti$_{0.05}$Ni$_{0.46}$Mn$_{0.46}$)O$_2$ electrode precursor of Example 2 was used to fabricate a Li$_{1+\delta}$(Li$_{0.02}$Ti$_{0.05}$Ni$_{0.46}$Mn$_{0.46}$)O$_2$ electrode electrochemically, in-situ, in an electrolyte-flooded glass cell. The cell had the configuration: Li/1M LiPF$_6$, EC:DEC (1:1)/Li(Li$_{0.02}$Ti$_{0.05}$Ni$_{0.46}$Mn$_{0.46}$)O$_2$. The electrode slurry was fabricated as described in Example 5. Metallic lithium foil was used as the counter electrode. A Li(Li$_{0.02}$Ti$_{0.05}$Ni$_{0.46}$Mn$_{0.46}$)O$_2$ cell was discharged at a constant current of 0.1 mA/cm$^2$ between 3.5 and 1.25 V. The electrochemical discharge profile of this cell that shows the electrochemical fabrication of a Li$_2$MO$_2$ electrode of this invention between approximately 2 V and 1.4 V is shown in FIG. 8.

EXAMPLE 7

Figure 9:
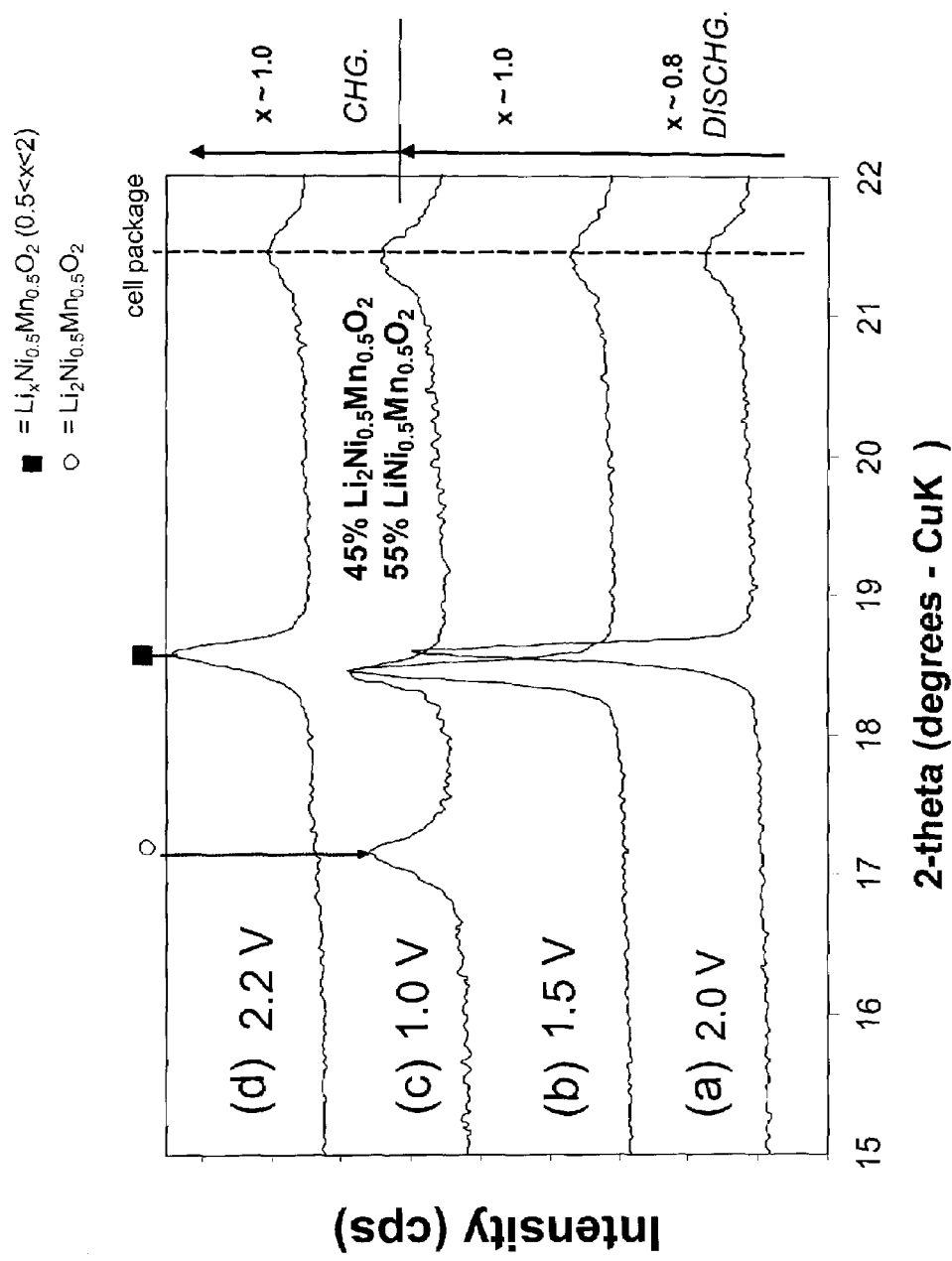
FIG. 9 depicts the X-ray diffraction patterns of an electrochemically lithiated $Li_{1+\delta}(Mn_{0.5}Ni_{0.5})O_2$ product obtained in-situ from a Li/electrolyte/$Li_x(Mn_{0.5}Ni_{0.5})O_2$ cell obtained at (a) 2.0V, (b) 1.5 V, (c) 1.0V and (d) 2.2 V.

The Li(Mn$_{0.05}$Ni$_{0.05}$)O$_2$ electrode precursor of Example 1 was used to fabricate a Li$_{1+\delta}$(Mn$_{0.5}$Ni$_{0.5}$)O$_2$ electrode of this invention electrochemically, in situ, in a coin cell, similar to that described in Example 5. A Li/1M LiPF$_6$, EC:DEC (2:1)/LiNi$_{0.5}$O$_2$ cell pouch was used for in situ X-ray diffraction experiments. The pouch cell was discharged at a slow constant current (0.06 mA/cm$^2$) to preset voltages of 2.0, 1.5 and 1.0 V on discharge, and to 2.2 V on charge, at which voltages the cell was allowed to equilibrate for 3 h. X-ray diffraction patterns were collected after equilibration at each voltage. The X-ray diffraction patterns of the electrode at 2.0 and 1.5 V are shown in FIGS. 9(a) and 9(b), respectively; these patterns show a slight shift in the diffraction peak at about 18.5 2θ indicative of slight changes in the lattice parameter of the Li$_x$Mn$_{0.5}$Ni$_{0.5}$O$_2$ electrode during the initial reaction. At 1.0 V, the X-ray diffraction pattern in FIG. 9(c) shows a two-phase product containing the Li$_{1+\delta}$Mn$_{0.5}$Ni$_{0.5}$O$_2$ ($\delta\approx1$) product of this invention (~45%) and the parent Li$_x$Mn$_{0.5}$Ni$_{0.5}$O$_2$ from which it was derived (~55%). On cycling the cell back to 2.2 V, the electrode regenerates the parent LiMn$_{0.5}$Ni$_{0.5}$O$_2$ structure as sen in FIG. 9(d), illustrating the reversibility of the reaction.

EXAMPLE 8

Figure 10:
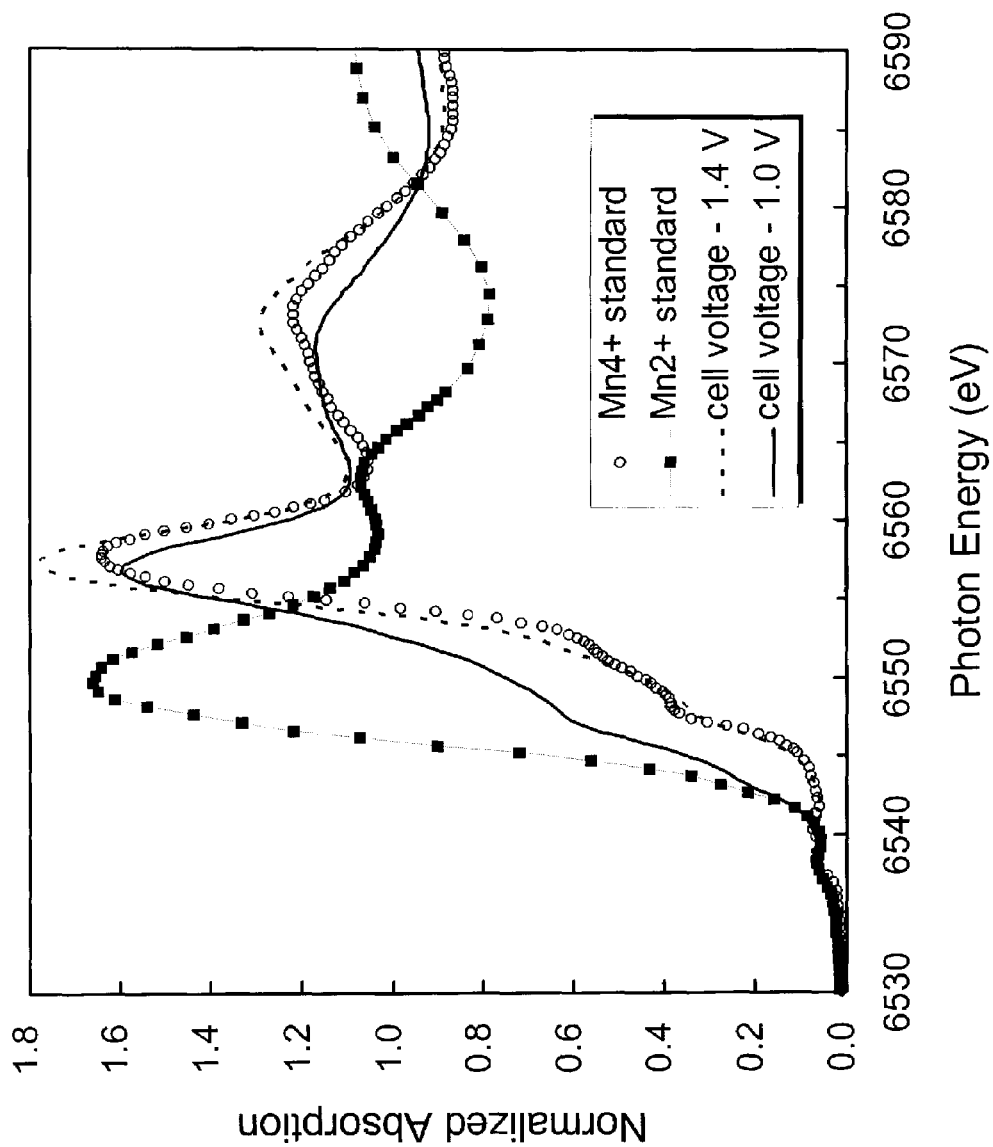
FIG. 10 depicts the Mn K edge X-ray absorption near-edge spectroscopy (XANES) spectra of an electrochemically lithiated $Li_{1+\delta}(Li_{0.02}Ti_{0.05}Ni_{0.46}Mn_{0.46})O_2$ product obtained in-situ from a Li/electrolyte/$Li_x$$(Li_{0.02}Ti_{0.05}Ni_{0.46}Mn_{0.46})O_2$ cell at cell voltages of 1.4 and 1.0 again $Mn^{4+}$ and $Mn^{2+}$ standards.

The Li(Li$_{0.02}$Ti$_{0.05}$Ni$_{0.46}$Mn$_{0.46}$)O$_2$ electrode precursor of Example 2 was used to fabricate a Li$_{1+\delta}$(Li$_{0.02}$Ti$_{0.05}$Ni$_{0.46}$Mn$_{0.46}$)O$_2$ ($\delta\approx1$) electrode of this invention electrochemically, in-situ, in a coin cell, similar to that described in Example 5. A Li/1M LiPF$_6$ in EC:DEC (1:1) electrolyte/Li(Li$_{0.02}$Ti$_{0.05}$Ni$_{0.46}$Mn$_{0.46}$)O$_2$ pouch cell was used for in-situ X-ray absorption spectroscopy experiments. Cells were cycled at constant current (12-24 mA/g or 0.05-0.1 mA/cm$^2$) down to a 1.0 V cutoff at 50° C. The Mn K edge XANES spectra for the Li/1M LiPF$_6$, EC:DEC (1:1)/Li$_{1+\delta}$(Li$_{0.02}$Ti$_{0.05}$Ni$_{0.46}$Mn$_{0.46}$)O$_2$ cell and two Mn oxidation state standards are shown in FIG. 10. At a cell voltage of 1.4 V, the Mn edge position or oxidation state value is similar to the Mn$^{4+}$ standard (Li$_2$MnO$_3$), and at 1.0 V it is close to the Mn$^{2+}$ standard (Mn(CH$_3$CO$_2$)$_2$. These results provide confirmation that a $Li_{1+\delta}(Li_{0.02}Ti_{0.05}Ni_{0.46}Mn_{0.46})O_2$ ($\delta \approx 1$) product with a layered $Li_2MO_2$ type structure is formed in accordance with this invention.

EXAMPLE 9

Figure 11:
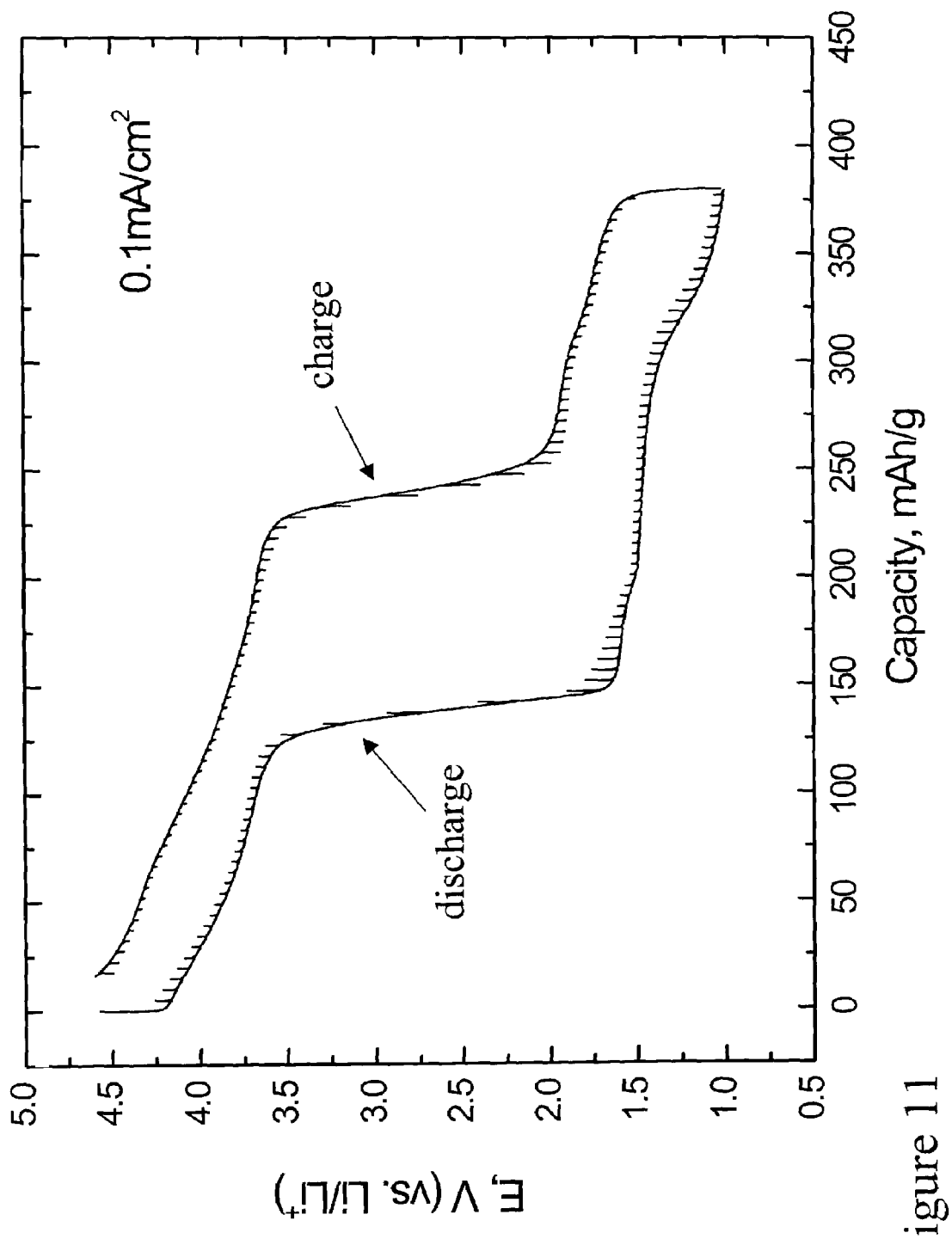
FIG. 11 depicts the electrochemical discharge and charge profile of a Li/electrolyte/$Li_x(Li_{0.02}Ti_{0.05}Ni_{0.46}Mn_{0.46})O_2$ electrochemical cell between 4.6 and 1.0 V.

The $Li(Li_{0.02}Ti_{0.05}Ni_{0.46}Mn_{0.46})O_2$ electrode precursor of Example 2 was used to fabricate a $Li_{1+\delta}(Li_{0.02}Ti_{0.05}Ni_{0.46}Mn_{0.46})O_2$ ($\delta \approx 1$) electrode of this invention electrochemically, in situ, in a coin cell similar to that in Example 5. The cell had the configuration: Li/1M LiPF$_6$, EC:DEC (1:1)/Li(Li$_{0.02}$Ti$_{0.05}$Ni$_{0.46}$Mn$_{0.46}$)O$_2$. The electrode slurry was coated with a doctor blade onto an aluminum foil substrate current collector. The coatings were dried in vacuum at a temperature of approximately 70° C. for 12 hours, and punched out as electrode laminates. Metallic lithium foil was used as the counter electrode. This cell was discharged and charged at constant current at 0.1 mA/cm$^2$ between 4.6 and 1.0 V. The electrochemical discharge and charge profiles of this cell are shown in FIG. 11, consistent with the reversible behavior of the $Li_2MO_2$ electrodes of this invention.

EXAMPLE 10

Figure 12:
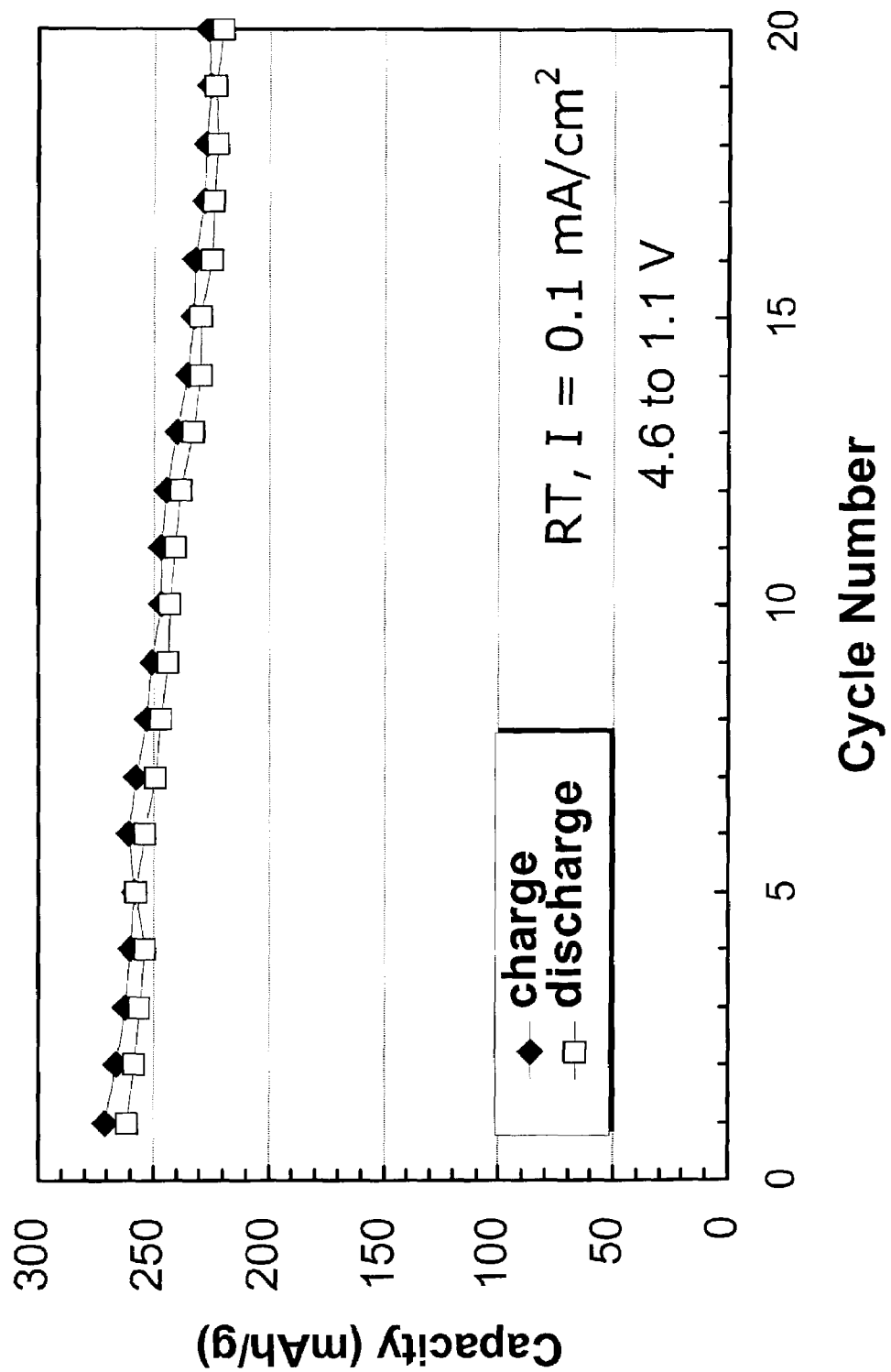
FIG. 12 shows a collective plot of capacity vs. cycle number for a Li/electrolyte/$Li(L_{0.02}Ti_{0.05}Ni_{0.46}Mn_{0.46})O_2$ electrochemical cell between 4.6 and 1.1 V.

The $Li(Li_{0.02}Ti_{0.05}Ni_{0.46}Mn_{0.46})O_2$ electrode precursor of Example 2 was used to fabricate a $Li_{1+\delta}(Li_{0.02}Ti_{0.05}Ni_{0.46}Mn_{0.46})O_2$ ($\delta \approx 1$) electrode of this invention electrochemically, in situ, in a coin cell similar to that in Example 9. This cell was discharged and charged at room-temperature and at constant current of 0.1 mA/cm$^2$ between 4.6 and 1.1 V. The plot of specific capacity of the electrode against cycle number, shown in FIG. 12, demonstrates that high electrochemical capacities can be achieved from the $Li_2MO_2$ electrodes of this invention with a high degree of reversibility.

EXAMPLE 11

Figure 13A:
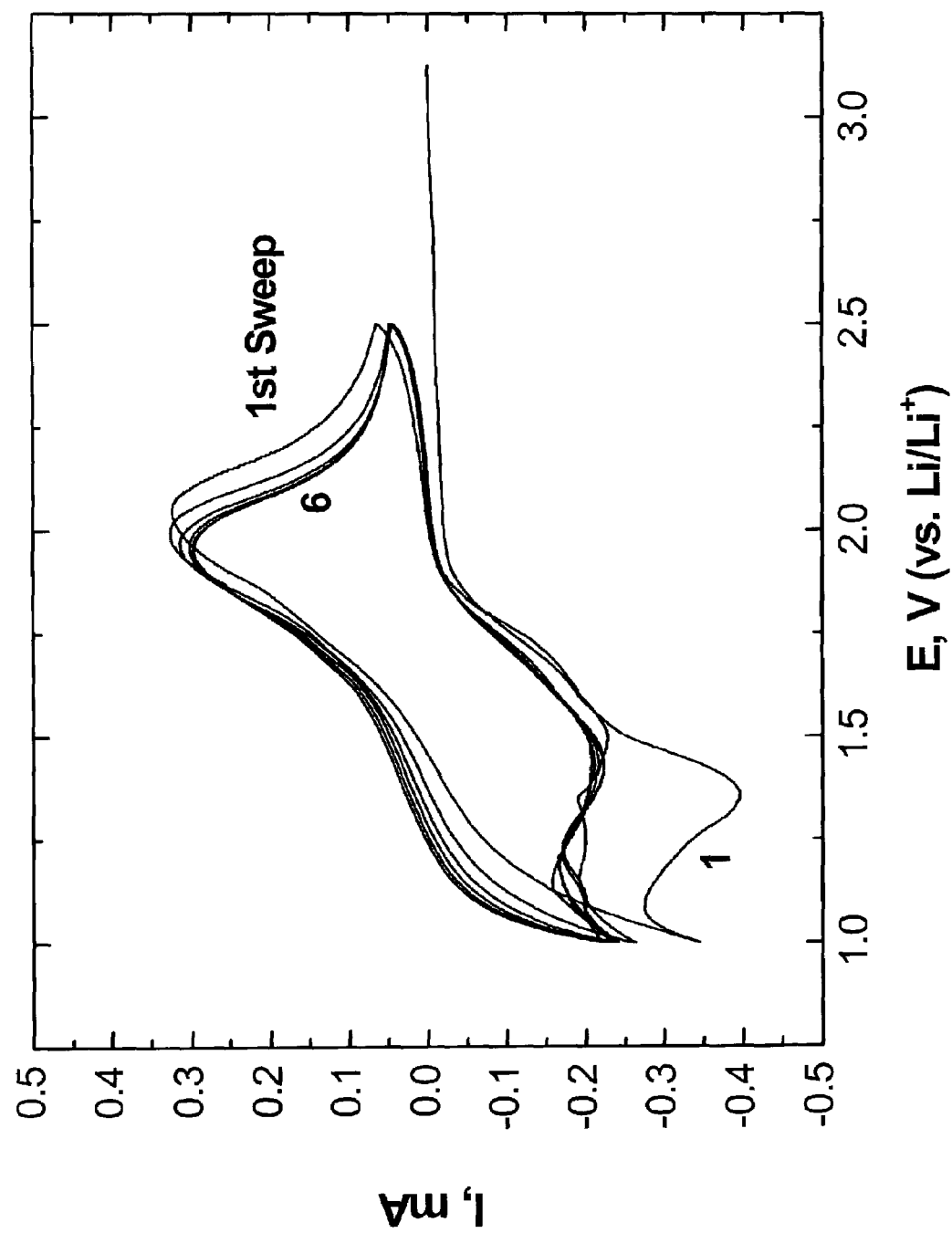
FIG. 13 depicts the cyclic voltammograms of (a) a $Li(Mn_{0.5}Ni_{0.5})O_2$ electrode between 2.5 and 1.0 V, (b) a $Li(Mn_{0.5}Ni_{0.5})O_2$ electrode between 4.0 and 1.0 V, and (c) a $Li(Li_{0.02}Zr_{0.05}Ni_{0.46}Mn_{0.46})O_2$ electrode between 4.8 and 1.0 V.
Figure 13B:
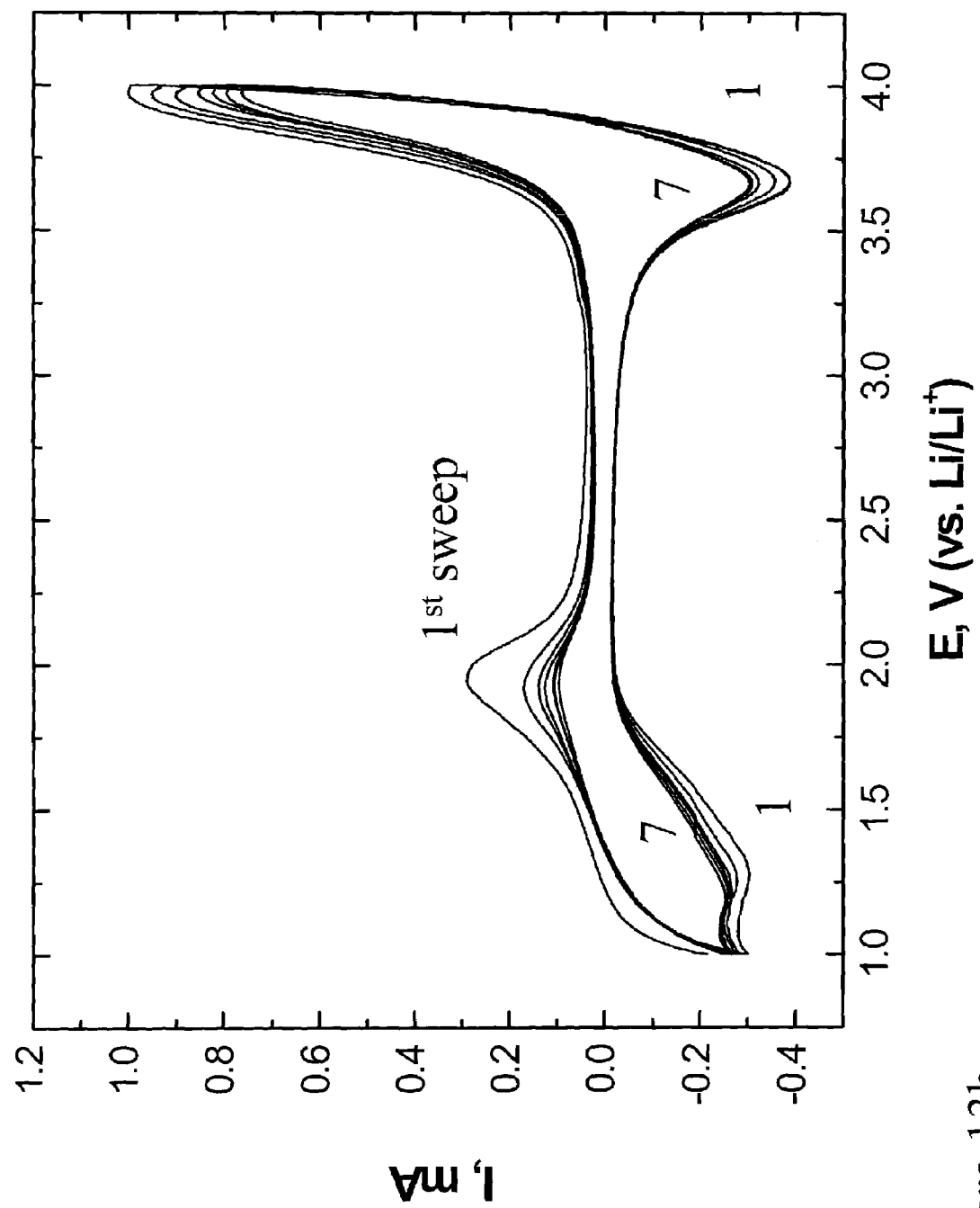
Figure 13C:
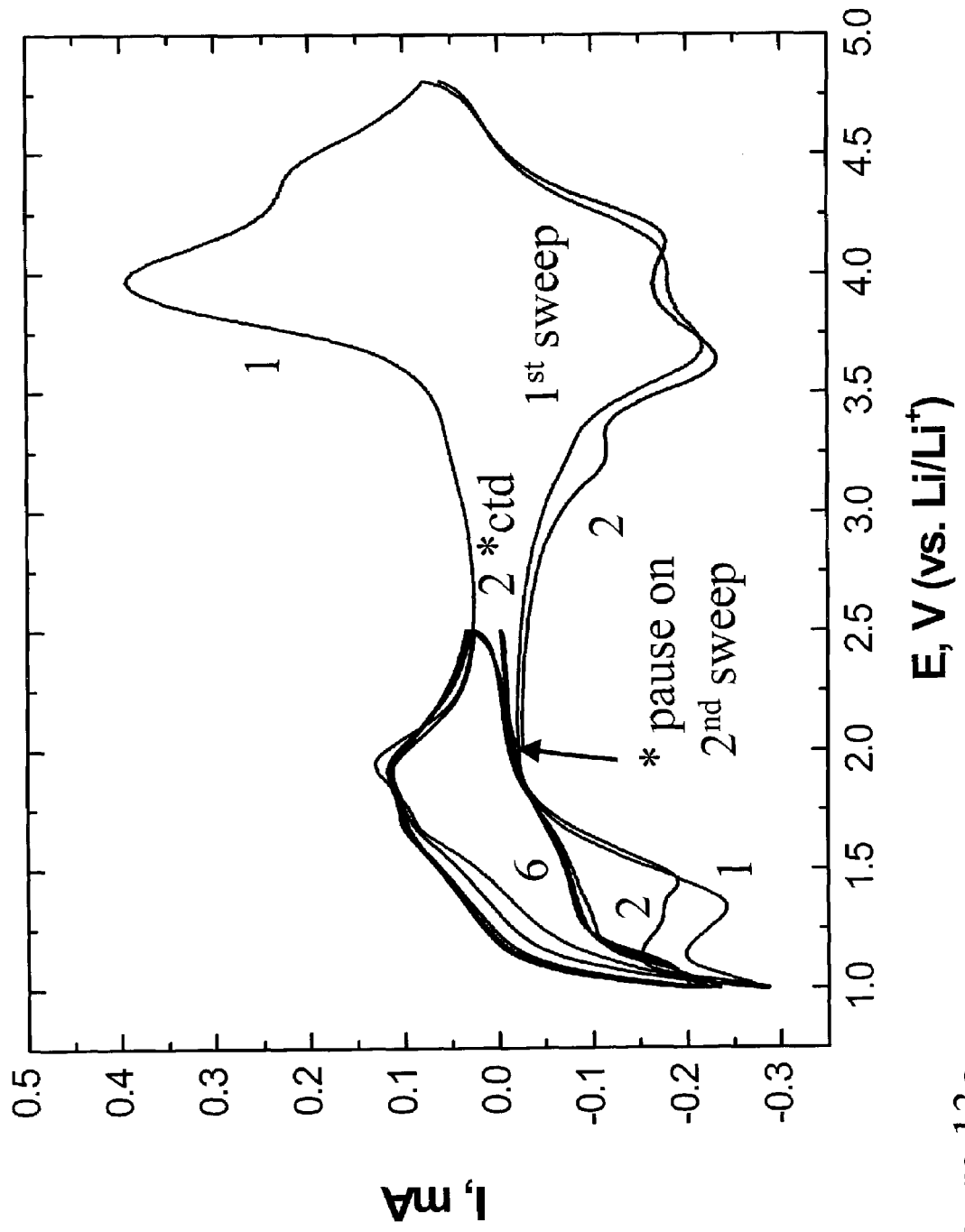

Cyclic voltammograms of a $Li(Mn_{0.5}Ni_{0.5})O_2$ electrode and a $Li(Zr_{0.05}Li_{0.02}Mn_{0.46}Ni_{0.46})O_2$ electrode, in which the voltage window was varied between the voltage limits of 1.0 and 4.8 V, using a slow sweep rate of 0.05 mV/sec are shown in FIGS. 13($a$-$c$). The data, which were recorded against lithium metal counter and reference electrodes, show that lithium can be reversibly cycled in and out of $LiMO_2$ electrodes in accordance with the principles of this invention. In FIG. 13$a$, the cyclic voltammogram shows that lithium can be cycled in and out of a $Li(Mn_{0.5}Ni_{0.5})O_2$ electrode over the voltage range 2.5 to 1.0 V, corresponding to the reversible lithium insertion into a $Li_{1+\delta}(Mn_{0.05}Ni_{0.5})O_2$ electrode for $0 \leq \delta \leq 1$. FIG. 13$b$ shows the cyclic voltammogram of the same electrode that is subsequently cycled between 4.0 and 1.0 V; the data demonstrate that the reversibility of oxidation processes at both ~4 V and at ~2V vs. Li, but also show that the cycling efficiency decreases with cycle number. Although further improvements in the cycling performance can be expected, this finding suggests that $Li_2MO_2$ electrodes may have greater utility for supplying additional lithium to enhance the performance of $LiMO_2$ electrodes at high voltage and as an end-of-discharge indicator, rather than for providing additional capacity to the electrode by cycling the cells repeatedly to relatively low voltages, such as to 2 V or less. FIG. 13$c$ shows the cyclic voltammogram of a $Li(Mn_{0.46}Ni_{0.46}Zr_{0.05}Li_{0.02})O_2$ electrode cycled between 4.8 and 1.0 V (after several break-in cycles between 4.8 and 2.0 V, which are not shown), which further demonstrates the utility of $Li_2MO_2$ electrodes in accordance with the principles of this invention.

EXAMPLE 12

Figure 14A:
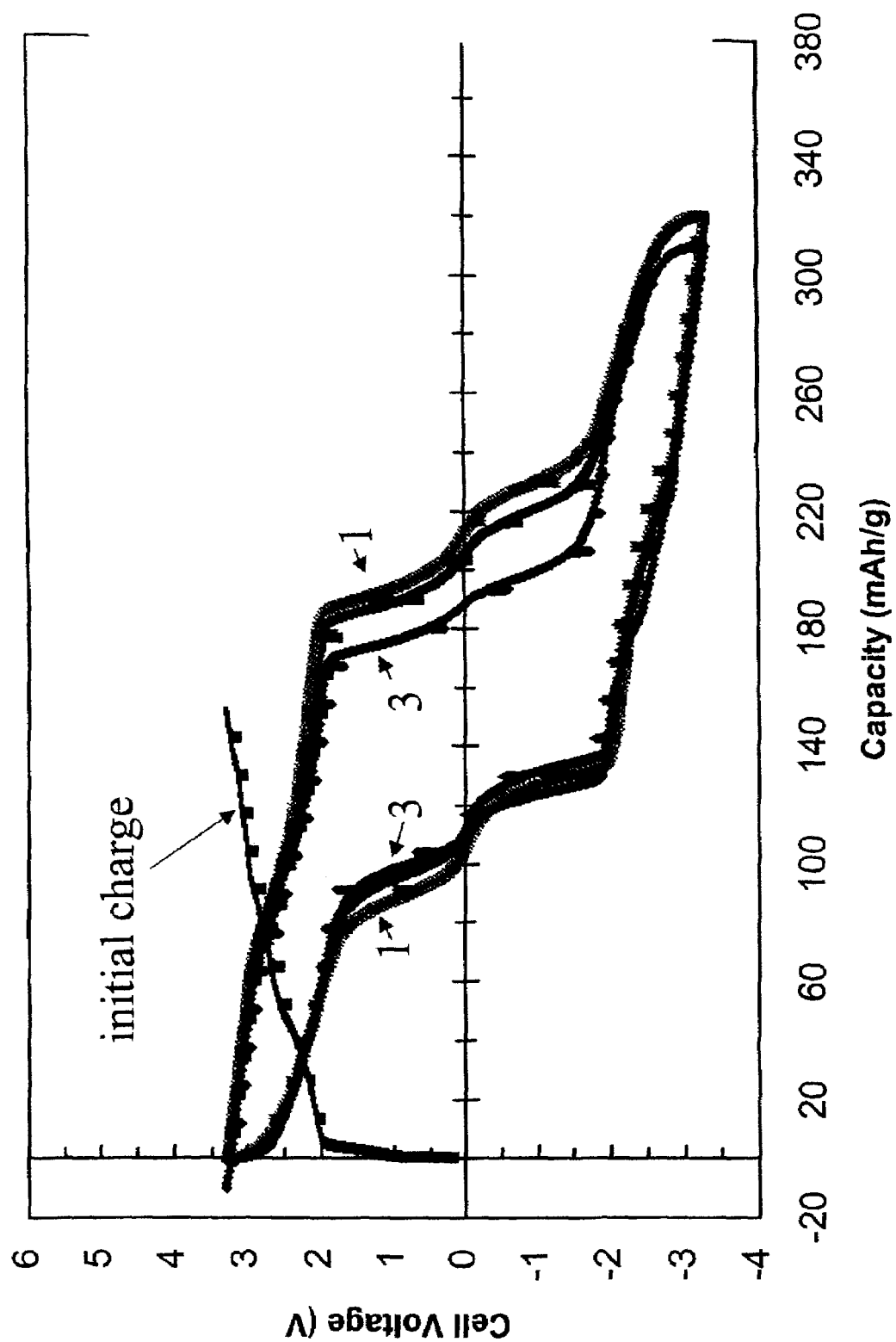
FIG. 14 depicts (a) the first three electrochemical discharge and charge profiles of a symmetric $Li(Li_{0.02}Ti_{0.05}Ni_{0.46}Mn_{0.46})O_2$/electrolyte/Li $(Li_{0.02}Ti_{0.05}Ni_{0.46}Mn_{0.46})O_2$ cell, and (b) the capacity vs. cycle number plot of the same cell.
Figure 14B:
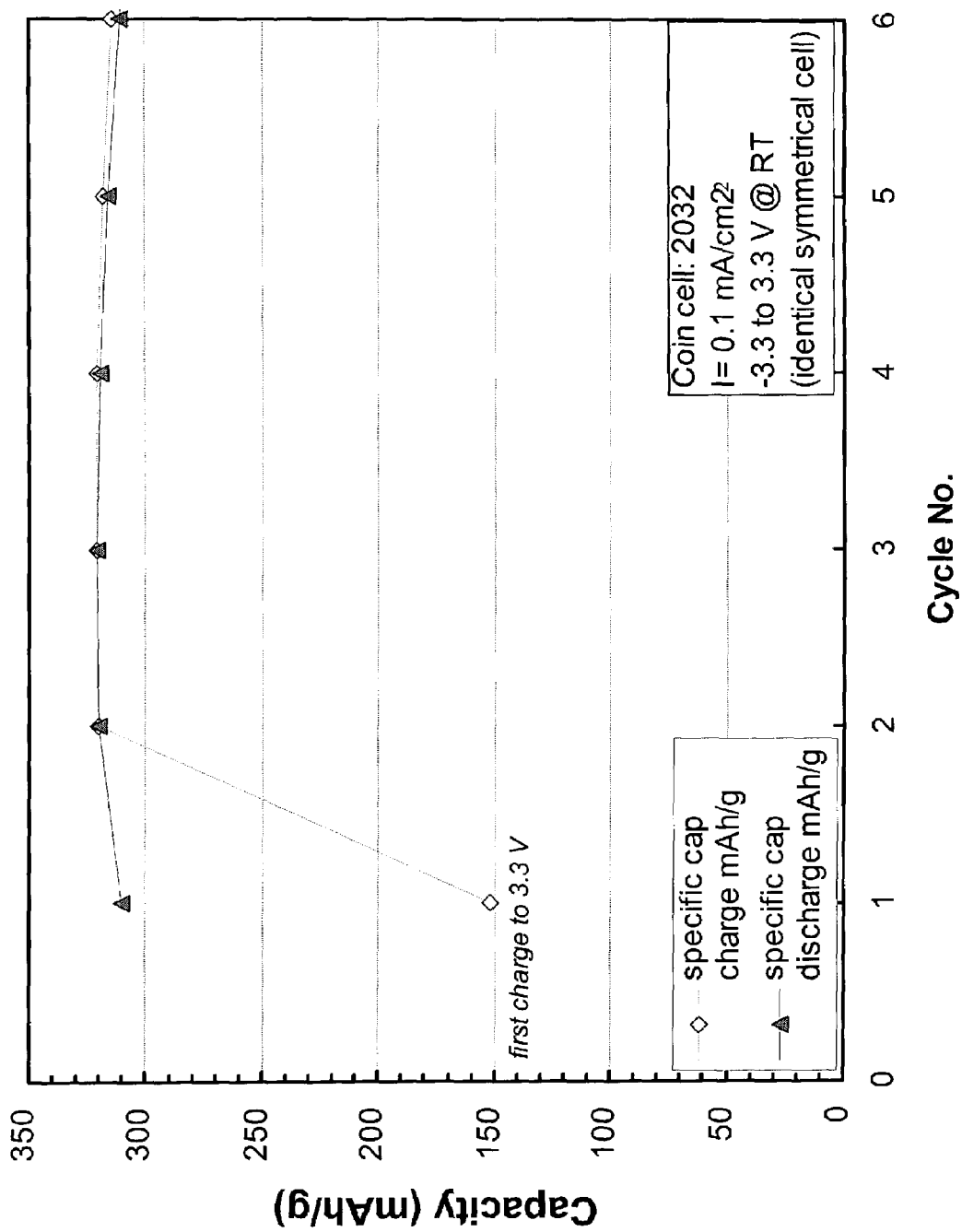

A lithium-ion cell with the symmetric configuration $Li(Li_{0.02}Ti_{0.05}Ni_{0.46}Mn_{0.46})O_2$/electrolyte/$Li(Li_{0.02}Ti_{0.05}Ni_{0.46}Mn_{0.46})O_2$ was assembled with compounds synthesized in Example 2 in a similar manner to the procedure described in Examples 5 and 9. The cell was cycled between the voltage limits 3.3 V and −3.3 V. The electrochemical charge and discharge profile of such a symmetric cell for the first three cycles is shown in FIG. 14$a$. During charge of this cell, lithium ions are extracted from the positive electrode to generate a $Li_{1-x}(Li_{0.02}Ti_{0.05}Ni_{0.46}Mn_{0.46})O_2$ composition, while lithium ions are inserted into the negative electrode to generate a $Li_{1-x}(Li_{0.02}Ti_{0.05}Ni_{0.46}Mn_{0.46})O_2$ composition which, for x=1, is $Li_2(Li_{0.02}Ti_{0.05}Ni0.46Mn_{0.46})O_2$. This process is reversible as shown by the inversion of voltage at 0 V, when the positive electrode and negative electrodes are interchanged. The process that occurs between 0 and 3.3 V corresponds to lithium extraction from one of the $Li(Li_{0.02}Ti_{0.05}Ni_{0.46}Mn_{0.46})O_2$ electrodes, whereas the process that occurs between 0 and −3.3 V corresponds to lithium insertion into the same electrode. The capacity vs. cycle number for each electrode of this symmetric cell is shown in FIG. 14$b$; it demonstrates that $Li(Li_{0.02}Ti_{0.05}Ni_{0.46}Mn_{0.46})O_2$ electrodes can provide a rechargeable capacity greater than 300 mAh/g when cycled over a wide voltage window, corresponding approximately to 4.4 to 1.1 V vs. metallic lithium. This example demonstrates the utility of using $Li_2MO_2$ electrodes as negative electrodes for lithium cells, with particular utility over the compositional range $Li_{2-\delta}MO_2$ ($0 \leq \delta \leq 1$) against more electropositive electrodes, and as positive electrodes when a greater compositional range can be utilized, $Li_{2-\delta}MO_2$ ($0 \leq \delta \leq 2$) against more electronegative electrodes, such as metallic lithium or lithiated graphite.

Figure 15:
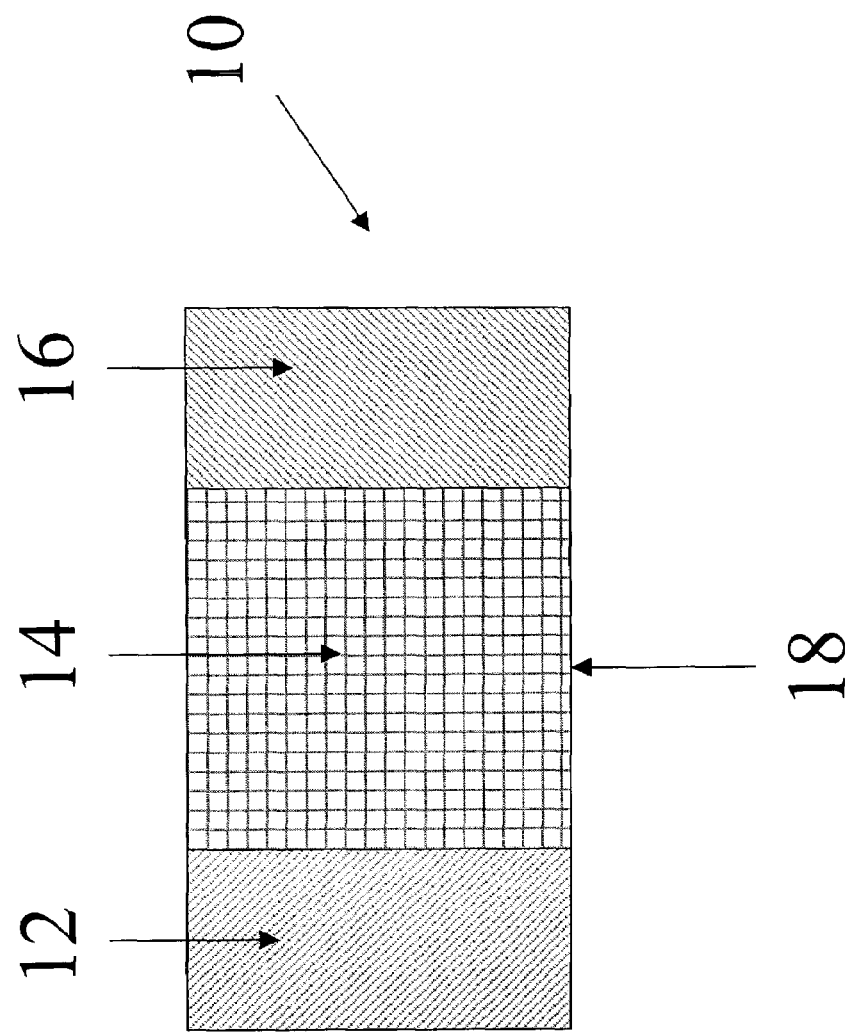
FIG. 15 depicts a schematic representation of an electrochemical cell.
Figure 16:
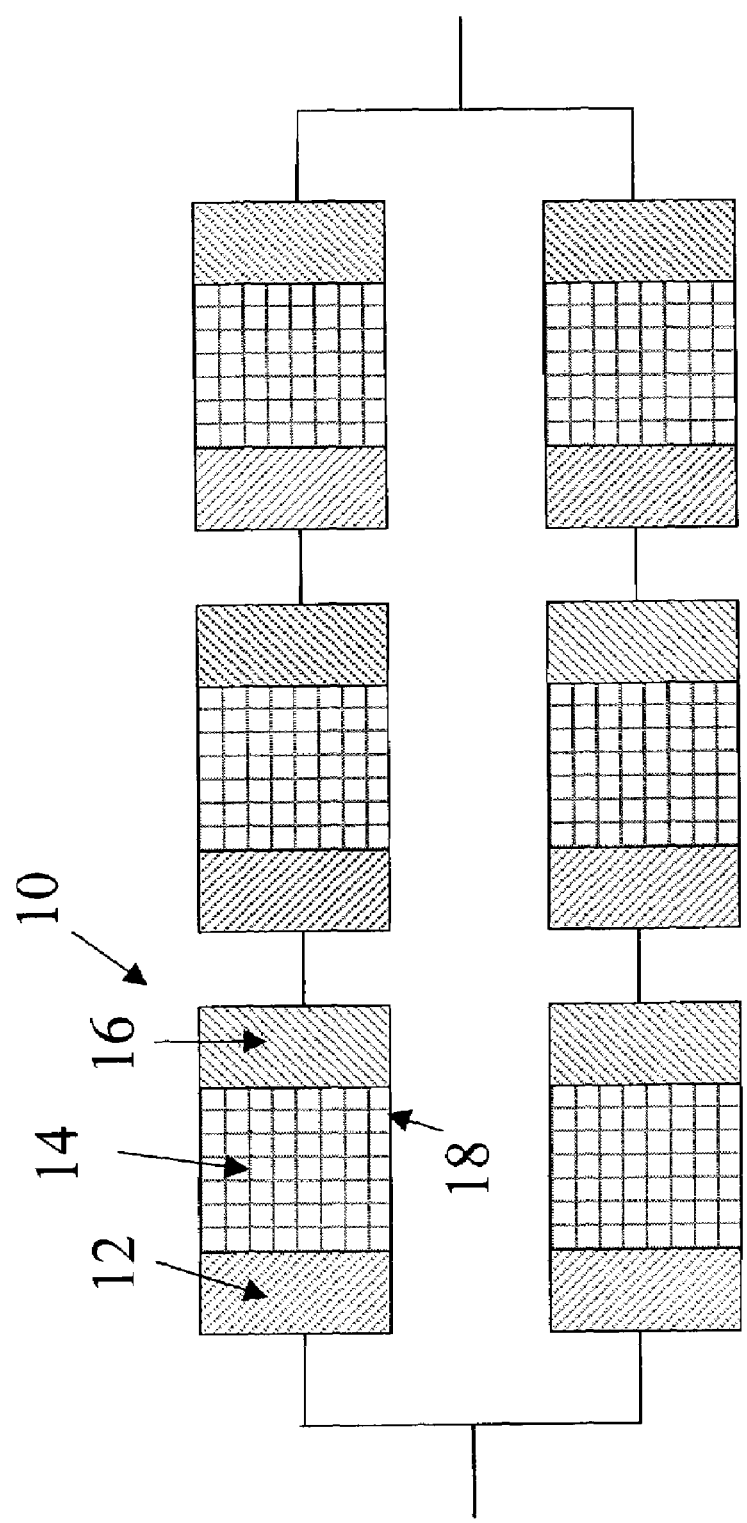
FIG. 16 depicts a schematic representation of a battery consisting of a plurality of cells connected electrically in series and in parallel.

This invention, therefore, relates to a lithium-metal-oxide compound that can be used as a precursor for the formation of a positive electrode for a non-aqueous electrochemical lithium cell or as a positive or negative electrode for such cells, as shown schematically in FIG. 15, the cell represented by the numeral 10 having a negative electrode 12 separated from a positive electrode 16 by an electrolyte 14, all contained in an insulating housing 18 with suitable terminals (not shown) being provided in electronic contact with the negative electrode 12 and the positive electrode 16. Binders, electronically-conducting additives and other materials normally associated with both the electrolyte and the negative and positive electrodes are well known in the art and are not described fully herein, but are included as is understood by those of ordinary skill in this art. FIG. 16 shows a schematic illustration of one example of a battery in which two strings of electrochemical lithium cells, described above, are arranged in parallel, each string comprising three cells arranged in series.

While particular embodiments of the present invention have been shown and described, it will be appreciated by those skilled in the art that changes and modifications may be made without departing from the true spirit and scope of the invention.

The embodiments of the invention in which as exclusive property of privilege is claimed are defined as follows:

1. An electrode for a non-aqueous lithium electrochemical cell, comprising a lithium-metal oxide compound having a layered $x\text{LiMO}_2.(1-x)\text{Li}_2\text{M'O}_3$ crystalline structure in which M is at least two different positively charged metal ions each having an atomic number less than 51, with M having an average oxidation state of 2 and M' is at least one metal ion with an atomic number less than 51 selected from one or more of Ti, Mn, Zr, Ru and Sn ions.

2. The electrode of claim 1, wherein the M, M' and Li ions are partially disordered over the M, M' and Li crystallographic sites of the $x\text{Li}_2\text{MO}_2.(1-x)\text{Li}_2\text{M'O}_3$ structure.

3. The electrode of claim 1, wherein the lithium ions are at least partially ion-exchanged with hydrogen ions.

4. The electrode of claim 1, wherein the $x\text{Li}_2\text{MO}_2.(1-x)\text{Li}_2\text{M'O}_3$ electrode is mixed or coated with an electronic conductor.

5. The electrode of claim 1, wherein M is selected from the first row of transition metal elements.

6. The electrode of claim 5, wherein M is selected from Ti, V, Cr, Fe, Mn, Co, Ni and Cu ions.

7. The electrode of claim 6, wherein M is Mn and Ni ions.

8. The electrode of claim 5, wherein M is partially substituted by one or more monovalent or multivalent non-transition metal ions with an atomic number less than 51.

9. The electrode of claim 5, wherein M is partially substituted by Li, Mg, Al or Sn ions.

10. The electrode of claim 1, wherein $x\text{Li}_2\text{MO}_2.(1-x)\text{Li}_2\text{M'O}_3$ is the positive electrode of an electrochemical cell.

11. A precursor of an electrode for a non-aqueous lithium electrochemical cell, said precursor comprising a lithium-metal oxide compound having a layered $x\text{LiMO}_2.(1-x)\text{Li}_2\text{M'O}_3$ crystalline structure in which M is at least two different positively charged metal ions each having an atomic number less than 51 and with an average oxidation state of 2 and in which M' is at least one positively charged metal ion selected from one or more of Ti, Mn, Zr, Ru and Sn ions and x is less than 1.

12. The electrode of claim 1, wherein $x\text{Li}_2\text{MO}_2.(1-x)\text{Li}_2\text{M'O}_3$ is the negative electrode of an electrochemical cell.

13. The electrode of claim 1, wherein $x\text{Li}_2\text{MO}_2.(1-x)\text{Li}_2\text{M'O}_3$ is the end-of-discharge indicator for an electrochemical cell.

14. The electrode of claim 1, wherein $x\text{Li}_2\text{MO}_2.(1-x)\text{Li}_2\text{M'O}_3$ is blended or mixed with one or more positive electrodes for a lithium electrochemical cell.

15. The electrode of claim 14, wherein the positive electrode has a layered, spinel or olivine-type structure.

16. The electrode of claim 15, wherein the positive electrode is selected from $\text{LiCoO}_2$, $\text{LiNiO}_2$, $\text{LiMnO}_2$, $\text{LiMn}_{0.5}\text{Ni}_{0.5}\text{O}_2$, $\text{LiMn}_{1/3}\text{Ni}_{1/3}\text{Co}_{1/3}\text{O}_2$, $\text{LiNi}_{0.8}\text{Co}_{0.15}\text{Al}_{0.05}\text{O}_2$, $\text{LiNi}_{0.75}\text{Co}_{0.15}\text{Ti}_{0.05}\text{Mg}_{0.05}\text{O}_2$, $\text{Li}_{1+x}\text{Mn}_{2-x}\text{O}_4(0<x<0.33)$, $\text{LiFePO}_4$, $\text{LiMnPO}_4$ and $\text{LiCoPO}_4$.

17. A compound comprising a lithium-metal oxide having a layered $x\text{Li}_2\text{MO}_2.(1-x)\text{Li}_2\text{M'O}_3$ crystalline structure in which M is two or more positively charged metal ions each having an atomic number less than 51 with M having an average oxidation state of 2 and M' is at least one metal ion with an atomic number less than 51 selected from one or more of Ti, Mn, Zr, Ru and Sn ions.

18. The compound of claim 17, wherein the M, M' and Li ions are partially disordered over the M, M' and Li crystallographic sites of the $x\text{Li}_2\text{MO}_2.(1-x)\text{Li}_2\text{M'O}_3$ structure.

19. The compound of claim 17, wherein the lithium ions are at least partially ion-exchanged with hydrogen ions.

20. The compound of claim 17, wherein M is selected from the first row of transition metal elements.

21. The compound of claim 20, wherein M is selected from Ti, V, Cr, Fe, Mn, Co, Ni and Cu ions.

22. The compound of claim 21, wherein M is Mn and Ni ions.

23. A non-aqueous lithium electrochemical cell comprising a negative electrode, an electrolyte and a positive electrode, wherein at least one electrode is said electrode of claim 1.

24. The cell of claim 23, in which the negative electrode is selected from carbon, graphite, a metal, a metal oxide, a metal nitride, or an intermetallic compound.

25. A non-aqueous lithium electrochemical cell comprising a negative electrode, an electrolyte and a positive electrode, wherein said negative electrode is said electrode of claim 1.

26. A non-aqueous lithium electrochemical cell comprising a negative electrode, an electrolyte and a positive electrode, the positive and negative electrodes including the precursor of claim 11.

27. A non-aqueous lithium battery comprising a plurality of electrically connected electrochemical cells, each cell having a negative electrode, an electrolyte and a positive electrode, said positive electrode being said electrode of claim 1.

28. A non-aqueous lithium battery comprising a plurality of electrically connected electrochemical cells, each cell having a negative electrode, an electrolyte and a positive electrode, said negative electrode being said electrode of claim 1.

29. A non-aqueous lithium battery comprising a plurality of electrically connected electrochemical cells, each cell having a negative electrode, an electrolyte and a positive electrode, said positive and negative electrodes including the precursors of claim 11.

* * * * *